(12) United States Patent
Verheyen

(10) Patent No.: US 11,159,312 B2
(45) Date of Patent: Oct. 26, 2021

(54) SECURE DATA EXCHANGE NETWORK

(71) Applicant: Henry Verheyen, Marina, CA (US)

(72) Inventor: Henry Verheyen, Marina, CA (US)

(73) Assignee: Henry Verheyen, Marina, CA (US)

( * ) Notice: Subject to any disclaimer, the term of this patent is extended or adjusted under 35 U.S.C. 154(b) by 0 days.

(21) Appl. No.: 17/008,573

(22) Filed: Aug. 31, 2020

(65) Prior Publication Data

US 2021/0067328 A1 Mar. 4, 2021

Related U.S. Application Data

(60) Provisional application No. 62/894,684, filed on Aug. 30, 2019.

(51) Int. Cl.
*H04L 9/08* (2006.01)
*H04L 29/06* (2006.01)

(52) U.S. Cl.
CPC .......... *H04L 9/0825* (2013.01); *H04L 9/0861* (2013.01); *H04L 9/0894* (2013.01); *H04L 63/0435* (2013.01); *H04L 63/0442* (2013.01); *H04L 2209/38* (2013.01)

(58) Field of Classification Search
CPC . H04L 9/0825; H04L 9/0861; H04L 63/0442; H04L 63/0435; H04L 9/0894; H04L 2209/38; H04L 9/14
See application file for complete search history.

(56) References Cited

U.S. PATENT DOCUMENTS

| | | | | |
|---|---|---|---|---|
| 2008/0260149 A1* | 10/2008 | Gehrmann | ......... | G06Q 20/3821 380/247 |
| 2011/0311044 A1* | 12/2011 | Westerveld | ............ | H04N 7/163 380/210 |
| 2016/0134594 A1 | 5/2016 | Teo et al. | | |
| 2016/0149899 A1* | 5/2016 | Abbott | .................. | H04L 63/061 713/171 |
| 2016/0373418 A1* | 12/2016 | Stahl | ...................... | H04L 9/0838 |
| 2018/0234388 A1* | 8/2018 | Reddy | ................. | H04L 63/0464 |
| 2018/0343505 A1 | 11/2018 | Loheide et al. | | |
| 2018/0376329 A1* | 12/2018 | Gapastione | ........... | H04W 12/06 |
| 2020/0007327 A1* | 1/2020 | Garg | .................. | H04L 63/0428 |

OTHER PUBLICATIONS

International Search Report and Written Opinion, Patent Cooperation Treaty Application No. PCT/US2020/048846, dated Nov. 27, 2020, fourteen pages.

* cited by examiner

*Primary Examiner* — Henry Tsang
(74) *Attorney, Agent, or Firm* — Fenwick & West LLP

(57) ABSTRACT

A secure data exchange system permits device to exchange secure message keys and securely transmit messages between devices. The devices may initially exchange temporary message keys that are used to encrypt permanent message keys. In addition, devices may have pairing managed that authenticates devices. Devices may be associated with an address ledger that maintains address information and is accessible with a public ledger key, which may provide different access to address information to different paired devices. Data within the system may also be encrypted with user device keys that prevents unauthorized access to data while permitting recreation of the user device key for data backup and migration.

18 Claims, 8 Drawing Sheets

Fig. 8

| Address Ledger for Device A | | | |
|---|---|---|---|
| NickName | Ledger Address # | Properties | IP Type |
| DevA | LEDGER-A | Direct List A<br>Relay List A<br>Backup List A<br>Forward List A<br>Spoke List A | Direct<br>Relay<br>Backup<br>Forward<br>Spoke |

800

SECURE DATA EXCHANGE NETWORK

CROSS REFERENCE TO RELATED APPLICATIONS

This application claims the benefit of U.S. Provisional Application No. 62/894,684, filed Aug. 30, 2019, which is incorporated by reference in its entirety.

BACKGROUND

This invention relates generally to network communications, and in particular to secure exchange of data across a network.

Internet protocols are vulnerable in ways, which can be categorized broadly as security, trust, privacy, and authentication. Security relates to online services (e.g., web servers) maintaining integrity, free of hacking, fraud, and other theft. Trust relates to how nodes communicate with one another, including protocols, domain name resolution (DNS), and message exchange services. Privacy relates to security of user data, including compliance with relevant law such as health privacy requirements (e.g., HIPAA) and data privacy requirements (GDPR). Authentication relates to how a user (or a device) identifies itself. This varies from simple passwords to complex method (e.g., REST API) to enable access to databases stored on a server. Together, addressing these potential vulnerabilities represent cornerstones of successful and effective development of further networking technologies.

Initially, when the internet (world-wide-web) grew popular, most was driven by public display of information: think science papers, encyclopedia, and sales fronts. All data was put up to be seen by as many people as possible, and few of these vulnerabilities were addressed.

Subsequently, we have seen the rise of the social networks, and a much higher level of global connectedness which has led to the aforementioned four corner stones of the internet emerging as major issues. In addition, encryption (protection) and user hiding (VPN) have become more proliferous and are stopgaps to aid in maintaining these four corner stones.

We will be introducing a system which covers all four of these four corner stones, while enabling login free device authentication (once authenticated), assurance of privacy and security, with multiple benefits, including the option for private data search.

There are several problems in current technologies in addressing the vulnerabilities discussed above. In general terms, all data being accessed over the internet is insecure. This is demonstrated by famous database breaches, password/profile hacking, crypto wallet theft, and so on. Laws that could prevent some of the malware and malicious servers are slow in keeping up with the fast-moving technology, and internet users are generally growing leery of who has access to and who stores copies of their data.

In addition, the internet itself is becoming more and more insecure. In past years, the internet was mostly being administered by 'known good companies', whereas nowadays, malicious servers and protocols can add themselves to the internet easier than in prior years. Domain Name System (DNS) tables can now be seen on untrusted servers and may be used improperly by hackers. In addition, domain resolution (i.e., how a service resolves a domain name to a network address) has various security and privacy/tracking flaws.

In addition, IPv6 has enabled the internet to grow the pool of internet connected devices (IoT) dramatically, but has not given much thought to the inherently required security. Many companies are coming up with cyber security solutions, both for servers, users, and IoT devices.

Supported by many news stories that increase in frequency regarding data breaches and internet hacking, users have become aware of privacy and security issues and the trust that was once established is waning. In terms of authentication, the once trusted password method is no longer sufficient for many websites/protocols, and two-factor authentication (2FA) is now in place in many places, leading to more frustration for users and delays in accessing services.

Most proposed solutions are difficult to understand, some bring their own data and user privacy issues, others are not widely used enough to reach critical mass, other are simply too esoteric and expensive. For example, private VPN, data encryption, incognito browsers, IP hiding, are all growing in popularity but are at risk of various vulnerabilities including more AI-driven intelligence.

Existing structures, such as the public key infrastructure, is used to assure integrity of (particular) internet web portal servers. This infrastructure includes significant complexity and includes various components such as a certificate authority, registration authority, validation authority, and timestamping authority.

Despite all the activity in these areas, a better solution is needed which handles these four corner stones of the internet in a better and more elegant solution.

In addition, virtually all applications that run on handheld devices struggle with the user identification. They struggle in multiple levels: user privacy, user protection (secure identification) and secure backup/restore. Furthermore, they are usually based on a central server, which can become a target for hackers.

We will propose a solution that virtually guarantees that any Device can be authenticated on the network without any risk of it being cloned, spoofed, listened to, or otherwise compromised.

Another problem that has complicated unique user identification is that many applications, including virus and hacker driven, misuse such information. Also, advertising and other data-mining applications need such information and are now frantically seeking (proposing) new solutions and the existing methods are being disabled one by one.

SUMMARY

One key aspect of the proposed solution is that it goes away from server (cloud) centric solutions and partitions a complex solution into many (recoverable) parts and pieces that work together in a cohesive manner. This makes this a new and novel approach.

Another key aspect of the proposed solution is that it leverages both distributed ledgers and encryption in such a way that data and/or security breaches may be ineffective because there is no central database or central point to 'hack' into. This makes this a safe and secure approach.

A software system is presented which enables secure digital data exchange over non-secure (public) networks. Mobile, PC, desktop, and sever applications can be added to provide further functionality which leverages the embedded user privacy and user data protection. The system consists of applications that run on user mobile and desktop devices and multiple sets of servers (managed by us as administrators, simply to register devices, in a secure manner). This allows users to have direct communication and not be subjected to a 3rd party monitoring (and filtering) of their every communication, while securing message content to be undecipherable.

The preferred embodiment links devices which have externally visible network addresses to each other, using distributed ledger record keeping methods. The described method can be extended to devices that are not externally visible (e.g. using a 'handler') and other, non-distributed ledger, record keeping methods (e.g. local, centralized, or cloud-based databases).

Device security may be protected with multiple types of protection: network address encryption, session encryption, and message encryption. They work together to jointly prevent undesired access to user data and enhance user privacy. Note that not all three are required to realize our embodiment, but in our preferred embodiment, all three are present.

In particular, network addresses stored in an address ledger specific to each device on the network. The address ledger is accessible only to devices holding a public ledger key shared by the device. The device may then update its address ledger to notify other devices of the location of the device. In addition, the ledger may include different layers that reveal different information to different public ledger keys, such that different devices and servers may receive different information about the address of a device, for example to give certain devices direct access and direct other devices to a relay or forwarding server.

In addition, devices maintain an individual 'address book' of paired devices, including messaging keys for communicating with each paired device. The messaging keys are securely shared and received from the devices, permitting effective message encryption between devices. In one embodiment, devices initially share a temporary message key with one another that is used to encrypt a permanent message key. Because the encrypted permanent message key can only be decrypted by the device that issued the public temporary key, the devices can be assured that the permanent public key is held only by the paired device. Accordingly, messages received from that device and decrypted by the permanent private key can be verified.

In a preferred embodiment, such device pairing implies unique key-pairs to be generated for each direction of communication. With doing so, the key-pair can also be used for authentication, e.g. using a simple query, and relying on the recipient's device being the only device that can both decipher and answer correctly in another encrypted message. In this method, the pairing becomes synonymous with authentication, and the traditional authentication, fire-wall, password, VPN, and other access methods become redundant.

Finally, data can be encrypted at the device with a private user device key that is not stored by other devices, and in some embodiments is not stored by the device itself. The private user device key can be re-generated based, in part, on user input, allowing the device to decrypt data when the user enters the code, and allowing device data to be backed up and migrated to another device when the user enters the appropriate user input. The stored data may also be tagged and have metadata that allows for private user data searches across different devices.

In addition, in one embodiment, applications would not require additional login password or biometrics. Because devices are uniquely paired, when another device receives a message, it can be confident that the device is the same device that previously paired with it. As a result, authentication can be minimized and, in some embodiments, authentication only takes place in three cases: joining the network, retrieving a backup, migrating to a new device. That is, using the app is natural and instinctively, while security is assured at the highest levels.

Finally, the approach can reduce spam and other unsolicited messages. In this system, spam would only be possible after pairing has been done first. But in doing so, a potential spammer has to identify its existence first and thus can be subsequently blocked or removed from a device pairing. Furthermore, pairing requires an active user acceptance, and information, such as a user profile, must be exchanged in advance. If a user is identified as a spammer, the user can un-pair such user, and notify the system to remove the spamming user from all paired records.

BRIEF DESCRIPTION OF THE DRAWINGS

FIG. 8 shows an example layered ledger, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
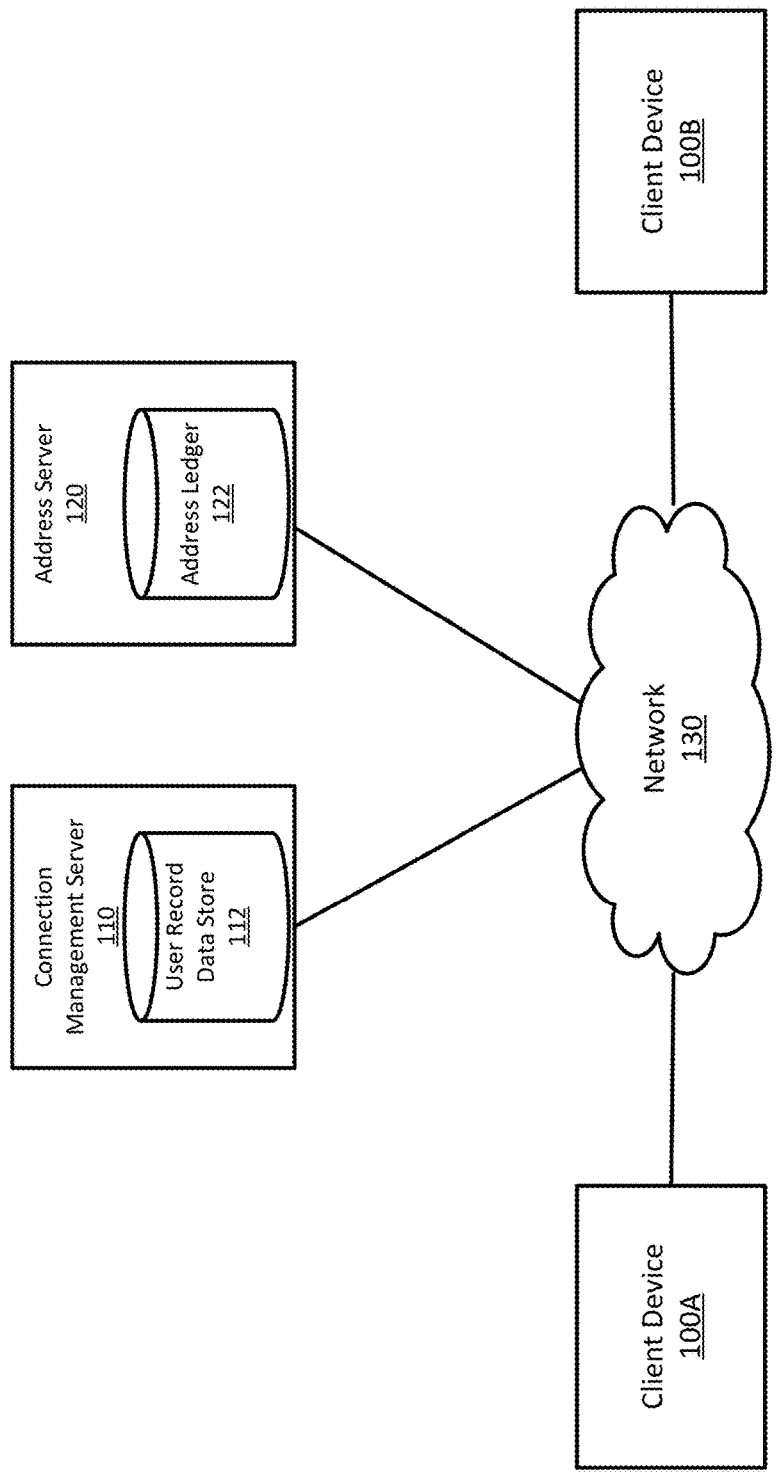
FIG. 1 is an example environment for a network to securely transmit data across a network, according to one embodiment.

FIG. 1 is an example environment for a network to securely transmit data across a network, according to one embodiment. Various devices are shown in FIG. 1, including two client devices 100A, 100B, a connection management server 110, and address server 120, and a network 130. In general, the client devices 100A and 100B establish and communicate secure (i.e., encrypted) messages to one another via the network 130.

The network 130 is a wired and/or wireless communication channel through which the various devices send and receive messages to one another. In general, the network 130 delivers messages to a network address associated with each device on the network, for example to an Internet Protocol (IP) address associated with each device. Typically, the network consists of various networking devices and transmission channels that route and deliver messages (e.g., packets) along the network. Accordingly, the network 130 often includes devices operated by entities that are not trusted and present a risk to insecure messages.

In various embodiments, to securely communicate with another device 100, the devices 100 exchanges keys with the device 100 being communicated with. The keys used for encrypting a message to another device are termed "device keys." Each device may exchange device keys specific to each other device that the device communicates with. In the example shown in FIG. 1, client device 100A exchanges device keys with client device 100B. In this example, client device 100A has a public device key from client device 100B with which to encrypt messages to be sent to client device 100B, and client device 100B has a public device key from client device 100A with which to encrypt messages to be sent to client device 100A. Similarly, client device 100A and 100B each has a private device key for decrypting messages received from the other. In this example, each public-private device key pair is specific to each pair of devices. For example, client device 100A has a first set of keys for communicating with client device 100B, a second set of keys for communicating with another client device (not shown), and a third set of keys for communicating with connection management server 110, etc. As such, a device may use a specific set of device keys may be used with each pair of one device in communication with another device. As used herein, a "device" includes any discussed computing system, including a client device 100, connection management server 110, and address server 120.

As generally used herein, public/private keys are used for encrypting or decrypting a message with an asymmetric encryption algorithm. An asymmetric encryption algorithm uses one key to encrypt and another key to decrypt a message. The key used to encrypt a message and the associated private key that decrypts the encrypted message are termed a public/private key pair. Example asymmetric encryption algorithms include DES, RSA, AES, and TwoFish. In some asymmetric encryption algorithms, either key may be used to encrypt a message and the Generally, one of the keys is distributed to another device (the public key) and another key is kept privately at the device that generated the public/private key pair. To securely share information with a device, the key used for encrypting a message may be the public key and used to encrypt a secure message sent to the receiving device. The receiving device retains the decrypting key as the private key to decrypt messages that were encrypted with the public key. As discussed herein, this approach permits a public key to be exchanged with other devices to send messages securely that can be decrypted only by the device holding the private key.

As an alternative, the encrypting key may be kept as the private key, while the decrypting key is shared with other devices as the public key. In this example, the private key may be used to authenticate the sending device or to ensure that only devices that have the corresponding public key (here, used for decryption) are permitted to read the encrypted message.

Because the message keys discussed below generally refer to a particular pairing of sender and receiver (i.e., the key pair is for a specific sending device to send to a specific receiving device), as a convention used herein, the receiver is indicated first followed by the sender. For example, a message key pair to be used with device 100A receiving messages from device B is referred to as message key pair AB. The private key of this key pair may be referred to as private message key AB, while the public key of this key pair may be referred to as public message key AB. Similarly, a message key pair for device 100B to receive messages from device 100A is referred to as private message key BA (B receives from A).

As discussed below, each device 100 generates a public/private key pair and maintains the private messaging key at the device. Because each set of messaging keys is securely exchanged between the devices, each set of messaging keys may be permanently stored at each device. In this way, each device maintains an "address book" of keys for devices with which the device has established communication.

The connection management server 110 maintains a user record data store 112 that maintains information about each client device and users of each client device 100. The connection management server 110 permits users to register devices associated with the user and to look up and connect to other devices. The connection management server 110 thus serves to provide control for authenticating and pairing devices in the network. For example, to connect with client device 100B, the client device 100A sends a message to the connection management server 110 with identifying information of the user or device. The connection management server 110 may then coordinate communication with the client device 100B to establish the secure communication channel between the client devices. In addition, as discussed further below, the connection management server 110 may manage a user identifier (UUID) and a user device key for managing secure data on the client device 100A, among other uses.

Finally, in some embodiments an address server 120 is used to maintain an address ledger 122 of address locations of devices on the network. In these embodiments, the address of a device on the network may be stored and updated at the address ledger 122. The address server 120 may be one of many address servers 120 that maintain a distributed address ledger 122 using distributed ledger technology (DLT). The address ledger 122 may be a cryptographically secure record of network addresses that are accessible and editable with appropriate keys. In some embodiments, the DLT is a distributed blockchain network. Each device may request a write to a blockchain associated with the device and use its private ledger key to sign a block representing new network address information for the device. In other embodiments, the address server 120 is a direct database (e.g., a SQL server). When a connection is made between devices, each device may share a public ledger key with the paired device that permits the paired device to decrypt the network address of the sharing device as stored on the ledger. Because many devices have dynamic network addresses or have network addresses that change when the device is moved to a different location, the address server 120 provides an identifiable, secure location for devices to update networking address information and determine the networking address of paired devices. In addition, the device may have multiple access levels for accessing a device's location information, e.g., to obscure the networking address of the device or to designate a forwarding/relay server for the communication. The operation of the networking address server 120 and additional features, such as a relay server and/or forwarding server (not shown) are further discussed below.

As discussed more fully below, this disclosure references several different types of keys to be used for secure communications and device security.

As further discussed below, in various examples the private or the public key may be used to write (encrypt) a message, and the corresponding key (public or private) is used to read/verify (decrypt) a message. Writing/encrypting a message with a private key (Private Key Write) may also be referred to herein as the "authentication method" because the public key may then be used to verify the authenticity of the sending device. Similarly, writing/encrypting a message with a public key (Public Key Write) may also be referred to herein as the "encryption method" because the private key may be used to decrypt the message and can ensure that only the device with the private key receiving the message can successfully decrypt and read the message. When the message (or ledger, or even session) key can be shared with many devices, e.g. in a Group Message Exchange, the Private Key Write (Authentication Method) is used. If the setup is such that only one device can decrypt, such as a Message Exchange, the Private Key Read (Decryption Method) is used. This assures that only the targeted device can decrypt such a message, and all other steps which give access to the message (routers, servers, etc.) do not compromise the security of the message at all (so public domain infrastructure can be used).

Certain functions for keys are briefly summarized here for convenience and further explored throughout this disclosure.

Direct Messages: Direct messages between devices are facilitated by message keys. In a simple scheme, each device creates a Public/Private Key pair, and exchanges the Public Key for message creation, which the device then can read with the corresponding Private Key. As messages will go two ways, there are two such key pairs, one for each device, yielding 4 keys in total. In one example, a device may use the same public message key for multiple sending devices (i.e., devices that send a message for the device to decrypt).

In further embodiments, device pairing is used to set up Messaging Keys. Essentially, a set of message keys is set up for each device pair. In this approach, each device Pair will compute the four required keys to set up a message exchange (2 Private, 2 Public) that is specific to the communication between those devices. Essentially, the Public Key is not widely shared and is sent only to the paired device, which is then the only device that can send a message that can be read by the corresponding private key. This scheme one significant benefit by preventing other devices with the public key from spoofing other required information. By using paired keys with each pair of devices, messages can only be created on the paired device, spoofing is not feasible.

Group Messages: A group key pair, which is set up in the 'reversed' direction—the Authentication Method—lets a Group Messenger encrypt the messages with the Private Group Message Key, and all members with the Public Group Message Key can decrypt such messages.

Device Data Encryption: A user device key pair is used to encrypt the local data on the device, using the user device key pair. Decryption is done using the user device key pair. These keys may be generated based in part on a user identifier of the user, pass phrase, and other factors as discussed below.

Address Access: A ledger key pair is used to encrypt a Device's current Network addresses, for other Devices (or Servers) to locate it and send messages. In a default scheme, the private ledger key is used to write, and the public ledger key is used to read information from the address ledger. In some embodiments, there are multiple private ledger keys, to be paired with their corresponding public ledger keys for different type of devices and connections.

In an alternate implementation, the private and public ledger key can be reversed, in this case a secure and trusted server generates a public/private key pair, and only this server can now track the device's Network address, as the device will write its Network address with the Public variant of this key.

Server Session: A session key pair enables secure combinations with the connection management server 110, which administers user data, and is also used for initiating backup/restoration/migration and connection management server interactions. Maintaining this key pair enables secure exchanges between the connection management server 110 and the device in a secure manner without requiring login and other authentication credentials.

The various components of the environment shown in FIG. 1 thus provide for increased networking security. First, because secure keys can be generated and exchanged between devices, devices can securely communicate with one another without other intermediate devices accessing information in encrypted messages. Importantly, the public message keys themselves are securely exchanged and the private message keys are not shared outside the device, preventing man-in-the-middle attacks and other attacks on message security. In addition, while the connection management server 110 manages the connections between devices, the connection management server 110 does not receive keys for the devices and likewise does not have access to messages sent between devices. Finally, once a connection is established, devices can directly message one another by looking up the address of the corresponding device in the address ledger. Devices are also generally not accessible to other, non-paired devices because those devices do not have the applicable ledger key to access a device's updated location.

Figure 2:
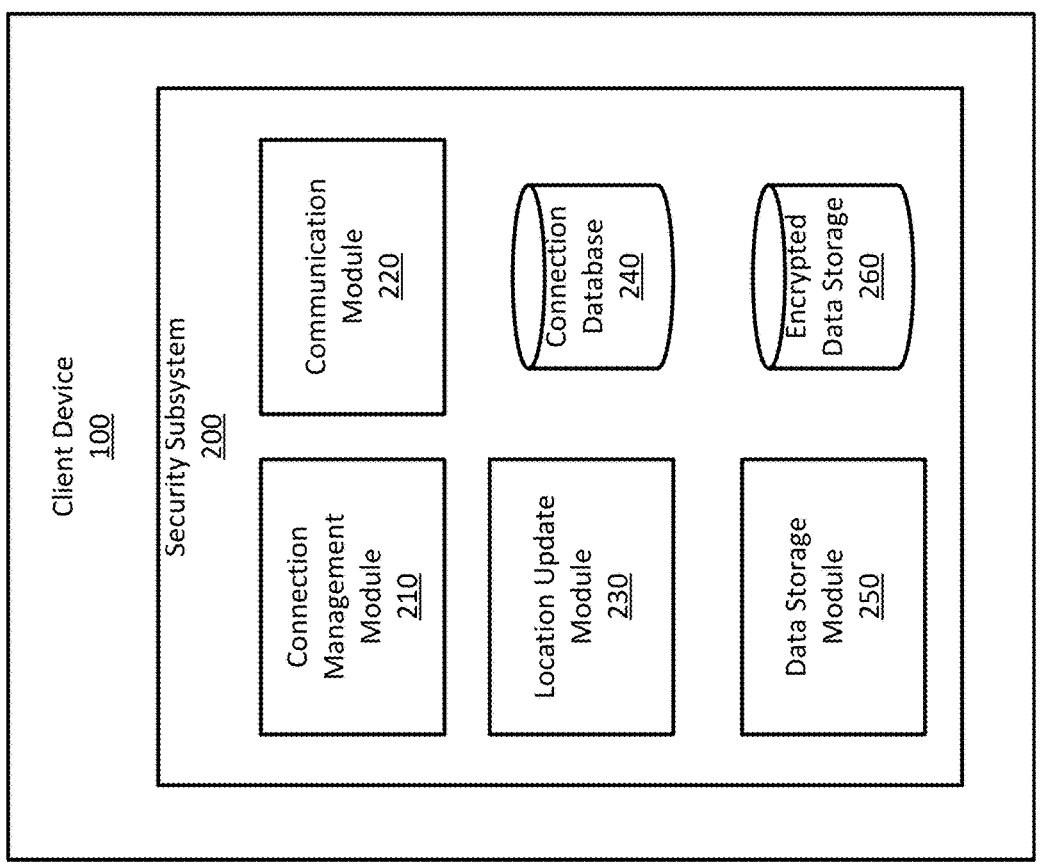
FIG. 2 illustrates example component software modules and data stores of a client device 100 for implementing the disclosed security features, according to one embodiment.

FIG. 2 illustrates example component software modules and data stores of a client device 100 for implementing the disclosed security features, according to one embodiment. The components shown in FIG. 1 implement the secure communications as discussed herein. These include a connection management module 210, a communication module 220, a location update module 230, a connection database 240, a data storage module 250, and an encrypted data store 260. These components together may represent a security subsystem 200 of the client device 100. The client device 100 typically includes additional components and modules, such as additional applications, operating systems, etc. executing on the client device 100. The software components (i.e., the computing modules) of the security subsystem 200 may be implemented as a portion of an operating system of the client device 100 or may operate as an application that is executed by the operating system. In general, the security subsystem 200 receives requests from other applications or processes executing on the client device to communicate with other devices across the network, establish communications with another device, or securely store data. In this way, the security subsystem 200 may operate as a layer for providing communications and data storage services for other applications and processes in the client device 100. In additional embodiments, the security subsystem may include further features and functions and may be implemented as a portion of an application providing other functionality. For example, the security subsystem 200 may be a portion of a chat application, streaming or media application, social networking application, gaming application, banking application, and so forth. Each component is briefly discussed here, and additional features and functions are discussed below in respective sections.

The connection management module 210 establishes connections with other devices across the network. The connection management module 210 generates public-private key pairs and coordinates exchange of relevant keys with other devices. As discussed further below, the keys may include user device keys, device keys, group keys, and ledger keys. The connection management module 210 generates and, when appropriate, stores keys for encrypting and decrypting related data as discussed below. Keys and other data about other devices are stored in the connection database 240. For example, the connection database 240 may store the private and public keys associated with individual paired devices and ledger keys for identifying a network address for communicating with the associated device.

When the connection management module 210 is initiated, the connection management module 210 may also obtain or create relevant keys for operation of the security subsystem 200. For example, in some embodiments a private user device key is used to access encrypted data storage 260 as further discussed below. The private user device key in some embodiments is not stored locally at the client device, but instead is deterministically generated (or re-generated) by the connection management module 210 and provided to the data storage module for accessing the encrypted data storage 260.

The communication module 220 manages transmission and receipt of messages to/from other devices on the network. When the security subsystem 200 receives a request to send a message to another device, the communication module 220 retrieves the appropriate keys from the connection database 240, obtains the networking address of the destination device, and encrypts the message with the appropriate key for the device. These features are further discussed below. Similarly, when a message is received, the communication module 220 retrieves the private key for decrypting the message and applies the private key to decrypt the message.

The location update module 230 monitors the networking location of the client device 100. When the networking location or other addressing information for the device change (as discussed below), the location update module 230 updates the address ledger 122 at the address server of the updated networking location for the device.

Finally, various aspects of this disclosure may be used in various combinations of other aspects of the disclosure. For example, the device keys may be securely exchanged between devices, determining device network location via an address ledger, and encrypting and managing data with a user device key may each be used separately or in various combinations.

Secure Connections

Figure 3:
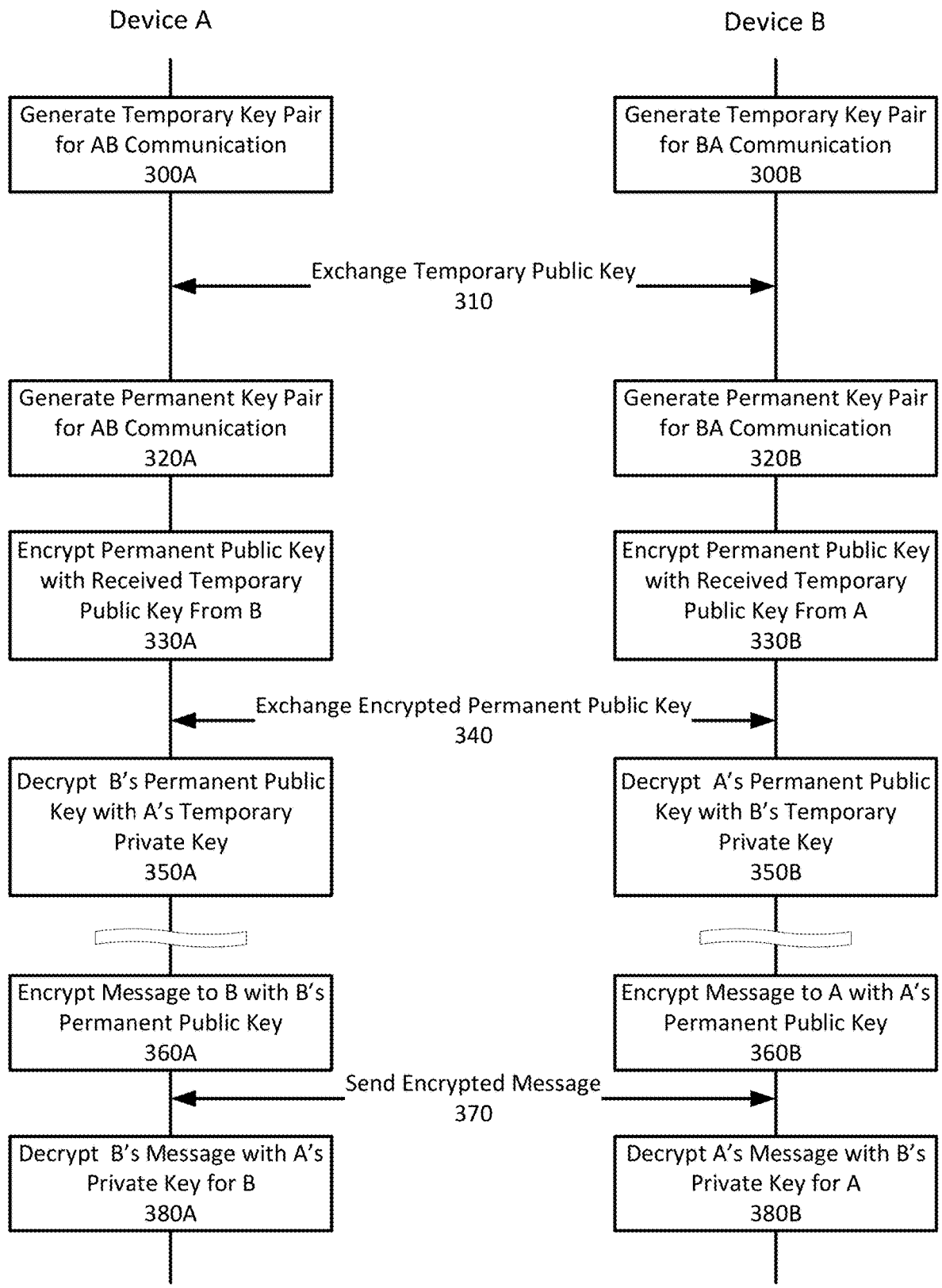
FIG. 3 illustrates a timing diagram for pairing two devices for secure communication according to one embodiment.

FIG. 3 illustrates a timing diagram for pairing two devices for secure communication according to one embodiment. In this example embodiment, device A is initiating a secure connection with device B. In this example, device A and device B may already have a means for communicating with one another, for example by with known addresses, or via the connection management server 110. As discussed below with respect to FIG. 5, in some embodiments the connection management server 110 may further facilitate establishing the connection (e.g., in cases where devices do not have known network addresses of one another).

Initially, device A may receive a request to initiate a secure pairing with device B. For example, the connection management module 210 of device A may receive a request to establish a pairing with device B. In the approach shown in FIG. 3, the pairing includes the exchange of a temporary key followed by a permanent key. In other embodiments, the temporary key may be omitted, and the permanent key may be exchanged directly. After determining to pair (e.g., subject to authorizations and/or approvals), each device generates 300 a temporary message key pair for messaging between the devices. The message key pair generated by each device corresponds to the key pair for that device to read/decrypt messages sent from the other device. For example, Device A generates 300A temporary message key pair AB corresponding to messages received by A and sent by B. Similarly, Device B generates 300B temporary message key pair BA corresponding to messages received by B and sent by A.

The temporary public keys are exchanged 310. Similarly, a permanent key pair is generated for communication between the devices. In this example, the actual public keys that are used for communication are not the initial temporary keys that are exchanged. This is because intermediaries (e.g., between the communication pathway between the devices) may be able to view the corresponding public keys and potentially spoof messages that appear to have been generated by the paired devices. Instead, the exchanged temporary public keys are used to send a second message between the devices which holds the actual public keys to be used to exchange messages in the future. Accordingly, in these embodiments the devices generate 320 a permanent key pair corresponding to the pair of devices. For example, device A generates 320A a permanent message key pair for device A to read/decrypt messages received from B, and device B generates a permanent message key pair for device B to read/decrypt messages received from device A. Using the received temporary public message key received from the other device, each device encrypts 330A its permanent public message key with the received temporary public message key. Thus, the permanent public message key AB (with which B can send messages for A to read) is encrypted with the temporary public message key BA (which only B can read/decrypt with its temporary private message key BA). The encrypted permanent public keys are exchanged 340 between the devices. Each device then decrypts/reads 350 the permanent public key for the pairing device using its temporary private key. Accordingly, device A decrypts 350A the permanent public message key BA (for B to receive messages from A) with the temporary private message key AB (for A to read messages from B). Similarly, device B decrypts 350B the permanent public message key AB (for A to receive messages from B) with the temporary private message key BA (for B to read messages from A). Each device may then store the keys corresponding to the pairing, for example in connection database 240. Thus, on device A, in association with the communication established with device B, device A stores the permanent private message key AB (A receiving from B), permanent public message key BA (B receiving from A), and may optionally store the permanent public message key AB (e.g., in case A needs to restore the key for B).

In some embodiments, also exchanged in the pairing step is the public ledger key for each device. Device B sends its public ledger key (to read device B's ledger) and similarly Device A sends its public ledger key to Device B. The ledger key is further discussed below in the section relating to address management.

Accordingly, the encrypted message containing the permanent public key is not readable by other devices, such as intermediate routers, servers, or (when applicable) the connection management server 110. While these other devices (not paired devices A or B) may hold only the original temporary public (write) message key, they do not have the corresponding read key to access the permanent public key. This guarantees that the permanent public and private keys will only be stored on the paired devices and may not need to be subsequently refreshed. In addition, because the permanent public message keys are securely transmitted between the devices (i.e., the receiving device is the only device that can decrypt and access the permanent public key for that receiving device to encrypt messages to be sent back to the sending device), each paired communication can be secure and when a message is received from a device and can be successfully read/decrypted with the private key for that pair, it can be assured that it was, in fact, that sending device that sent the message, providing further verification of the sender's identity.

After receiving the corresponding permanent public keys, the stored keys may be used to encrypt and end messages between the devices. This approach enables a point-to-point encryption method: the sending device encrypts a message which can only be decrypted by the receiving device. Stronger, the message can only be decrypted by the receiving device which holds the required Private Message Key. This key was created locally on the receiving device and was never send out anywhere. When the temporary key pair is used to exchange the permanent key, it can also be guaranteed that only the sending device has the appropriate permanent public message key corresponding to a permanent public message key.

The benefit of this message is that authentication of a message can be 'light' because only one known device can encrypt a message for a chosen public/private message key pair.

In the simpler method, essentially all devices would share the same Public Message Key if they are all paired to the same device. In this case, additional information is desirable to assure that only paired devices can send messages. This is needed to prevent false messaging.

To communicate messages to one another (e.g., device A wishes to send a message to device B), the devices determine the network address the corresponding device (not shown in FIG. 3). E.g., device A determines the network address of device B. In some embodiments, the network device is determined with the public ledger key for the corresponding device. For example, Device A may access the address ledger 122 and read the Network address for its 'friend' device B using the public ledger key of device B. Device A now properly formats an IP Route message to ping device B to confirm device B is available.

Device A encrypts 360A the message to B using the permanent public message key BA that is stored at device A. This creates a secure message payload using public message key BA that can only be read by device B's corresponding private message key BA. Device A sends the message 370 to device B. Device B then decrypts 380B the encrypted message using B's private key: private message key BA. To return a message, device B encrypts 360B a message to device A using device A's permanent public message key AB and sends 370 the message to device A. Device A decrypts 380A the message using the permanent private message key AB and accesses the unencrypted message.

Messages may fail to complete, and responses may or may not come. When the paired device doesn't respond, the message may subsequently be sent to a relay server as discussed below. The relay server cannot decrypt the message (because it does not possess the private key held by the paired device), but it can keep looking for the paired device, and eventually complete the message. Servers are presumed to be 'always on, always connected', whereas devices may not be.

In one embodiment, additional security checks may be added to the messaging scheme. For example, the devices may:

Verify the Network address, for example by confirming that the Network address corresponds to an address determined independently from accessing the address ledger 122 and verifying the sending address corresponds to a decoded address.

The device is paired and has a "nickname" matching the name at the device.

Confirm the private message key for messages received from that device successfully decrypts the message.

A sender may confirm that the recipient device is online before sending a message by confirming a ping (or other) response from the determined network address of the recipient device.

Figure 4:
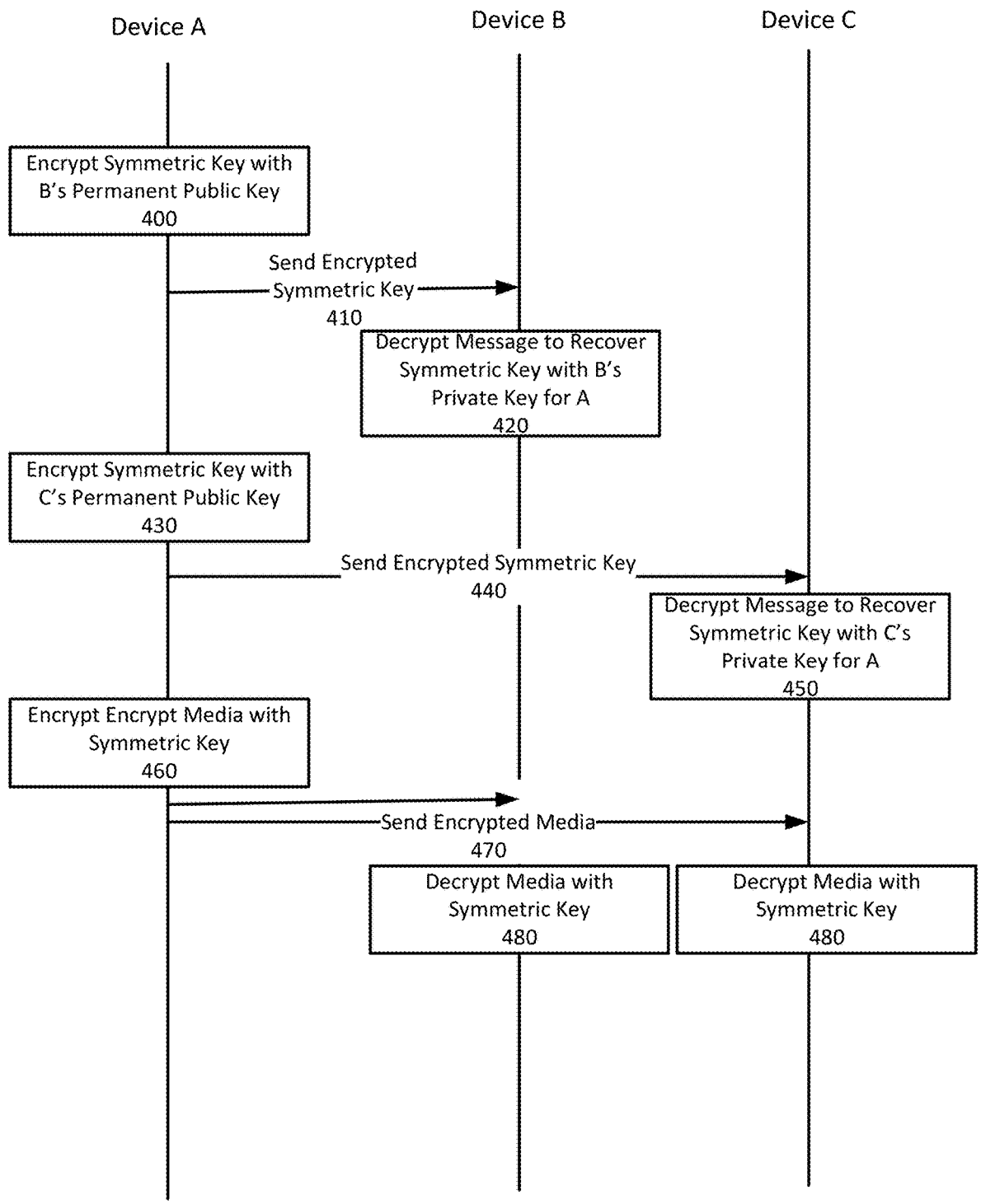
FIG. 4 shows an example timing diagram of an embodiment for sending media or streaming data between devices.

FIG. 4 shows an example timing diagram of an embodiment for sending media or streaming data between devices. Typically, streaming data is already digital and heavily compressed. Such data files can be easily exchanged. However, streaming data is also often proprietary information subject to usage, copying, and other limitations. To protect such data, the stream data file remains encrypted for the end-device (the user device) and preferably remain securely in the application.

However, such data is often typically relatively high bandwidth, and moreover decryption of this data with asymmetric encryption techniques can be prohibitively slow for a server to apply to a media stream and for a receiving device to apply to recover the media stream from encrypted messages. In one embodiment, the public/private messaging keys are used to transmit a symmetric key to decrypt a media file encrypted with the symmetric key. For a symmetric key (e.g., symmetric key encryption/decryption), the key used for encryption and decryption is the same. Typically, the encryption and decryption load on processors for executing a symmetric encryption algorithm is lower than asymmetric encryption. Accordingly, according to embodiments of the invention, to effectively and securely transmit and use media files, a secure message key pair is used to transmit the symmetric key. the symmetric key is transmitted to a device using the secure message key pair.

FIG. 4 shows three devices, including device A that transmits media and devices B and C that display media. Device A may be, for example, a content delivery network (CDN) or other system that obtains and sends media content. The media may be a stored audio or video file or may be a live or streamed broadcast currently being captured and transmitted. The playing devices B and C may be other computing devices, such as a mobile device, laptop, desktop, etc. computer, and may also include set-top boxes or "smart" TVs with integrated processing and networking capabilities. In one embodiment, the playing device is a playback device that uses the approach herein to provide high-bandwidth digital content protection for the media. Although two playing devices are shown in FIG. 4, in other embodiments many devices may be present that receive the symmetric key and the encrypted media file. Each of the viewing devices (i.e., device B and C in this example) establish a device pairing with the streaming device (here, device A) in advance of such as streaming solution.

To securely send media, device A generates a symmetric key and sends the symmetric key to devices B and C. Device A is paired with each other device and has a public message key corresponding to each other device, for example public message key BA and public message key CA. To send the symmetric key to each device, device A encrypts the symmetric key with the permanent public messaging key corresponding to that device. Thus, device A encrypts 400 the symmetric key with B's permanent public message key and sends 410 the encrypted symmetric key to device B. Device B can then decrypt 420 the message to recover the symmetric key. Similarly, device A encrypts 430 the symmetric key with the public message key for device C, sends 440 the encrypted symmetric key to device C, and device C decrypts 450 the message with its corresponding key.

To send the media to the devices, the streaming device/service encrypts 460 the media with the symmetric key. The streaming device (i.e., device A) may then send 470 the encrypted media to device B and device C (and any other devices streaming the media) and may decrypt 480 the media at the respective devices using the symmetric key that was securely transferred to the device.

Although referred to here as a single "symmetric key," the symmetric key may be a symmetric key chain comprising a sequence of symmetric keys. Each key has a timestamp designating the portions of the media to which to apply the key, and each key is symmetric. Each key can use a different key length and a different encryption protocol. Timestamps can be of any interval, e.g. 30 seconds or smaller (each message can have a different key). A key chain sequence is typically randomly selected, varying each and any of the parameters between keys.

This approach can create for e.g. a broadcast encryption (live broadcast or music channels) a new key every 30 seconds. Or, e.g. a 2-hour live sports event would generate 180*2=360 keys. Such keys are predetermined and can be sent out in one or several messages via the message key pairs. This approach ensures that the media (e.g., a broadcast) cannot be decrypted by any device which does not have access to the created key chain via the secure messages.

For on-demand media, the media may be encrypted one-to-one for the specific device requesting the media and the media is encrypted differently for each recipient. Each viewing (listening) device will have the proper key chain, and this is then transparent to the viewer as simply different (symmetric) keys are used at different times.

The secure message (public/private key) exchange happens in the background. If the streaming device detects noticeable latency, the first segment of the media file may be unencrypted, or use a standard key, until the secure message is decrypted, after which the media may use the symmetric key. Because the symmetric key/key chain is sent as a secure message, it is not visible to the internet and cannot be decrypted by a non-targeted recipient (no public/private key pair exchange).

The benefit of this method is that the encrypted message on the server has to be created once for all recipients. This is once for on-demand for each viewer, but for a live broadcast where thousands of viewers are online, this one-to-many method enables a higher efficiency on the server.

Figure 5:
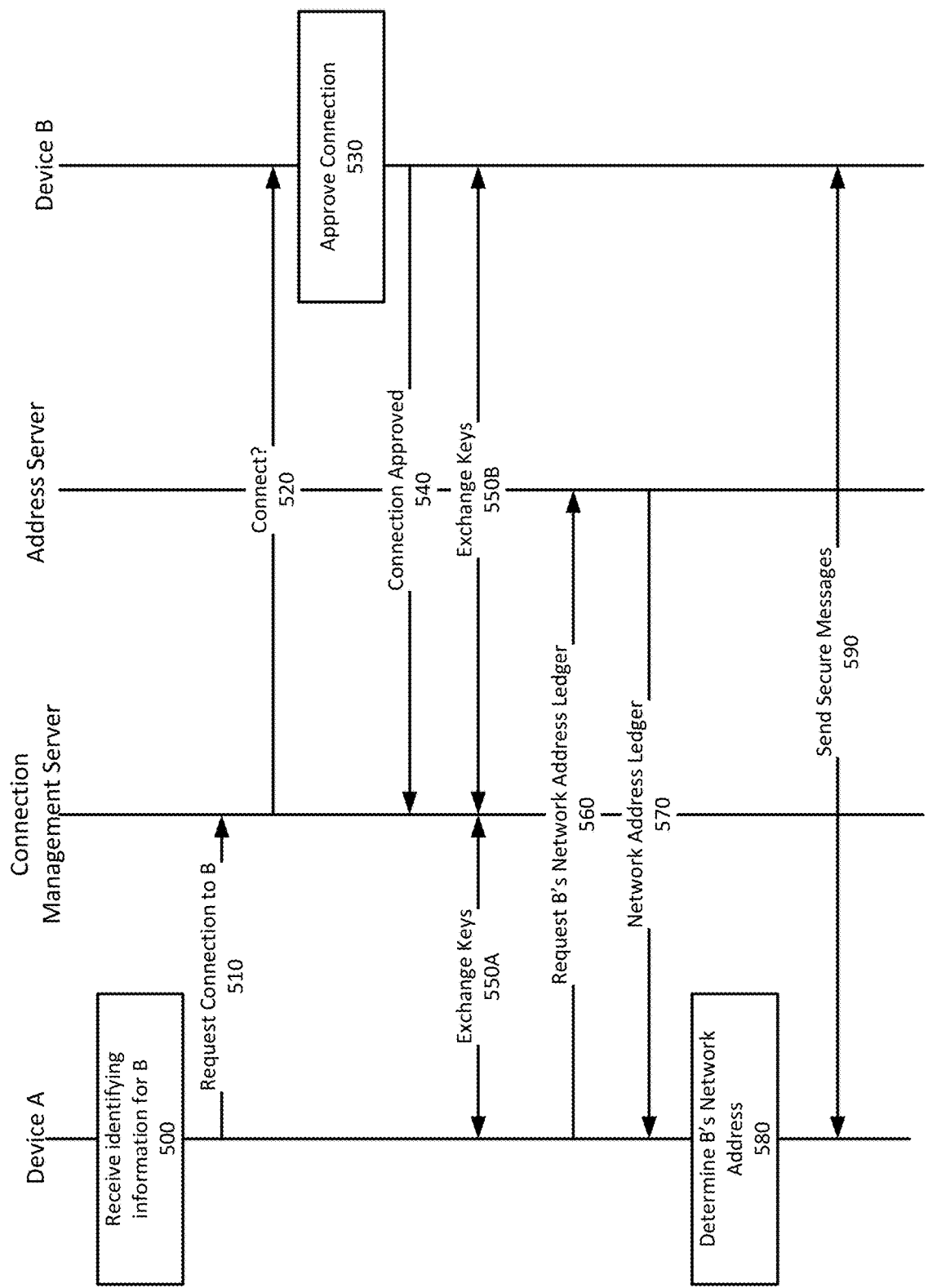
FIG. 5 shows an example timing diagram for pairing devices in conjunction with a connection management server.

FIG. 5 shows an example timing diagram for pairing devices in conjunction with a connection management server. In this example, device A does not know the address of device B in the network. The connection management server is used to coordinate the connection between the devices. Thus, before User A can pair with User B, a method must be established for finding User B in the network. In one example, device A identifies or receives 500 identifying information for device or user B. As one example, such identifying information may be a phone number, email, username, or other information.

Device A initiates a connection request to connection management server 110 to request 510 a connection to device B. In this example, device A establishes an encrypted session with the connection management server, for example with a public/private session key pair. The session key is discussed further below and provides for secure communication between the client devices authenticated with the connection management server 110. Using the identifying information received from device A, the Connection management server 110 matches this information and finds User B in its Connection management server 110 user record data store 112. Typically, when an approval for the connection is needed and device B is not immediately available, device A waits for a further response.

In some embodiments, the connection management server 110 directly messages device B to request 520 connection with device A. In another embodiment, or if device B is not currently available, the connection management server 110 executes the request by raising a flag and awaiting Device B to contact the Connection management server 110. That is, in some embodiments, when a device (here device B) comes online (or at some other interval) devices contact the connection management server 110 to establish connections and for other data management and backup as further discussed below. After Device B connects to the connection management server 110 (e.g. with a new https session using its session key (as discussed below)), the connection management server 110 requests 520 approval for pairing with Device A. Device 2 determines whether to approve the connection, which may be a presented to user for approval, or may be automatically determined based on approval settings of the device. The approval is sent 540 to the connection management server 110.

Similar to the pairing discussed in FIG. 3, the devices exchange 550 public/private message keys, which may include a temporary public key and an encrypted permanent key. The two devices, device A and device B now add each other's info to its local records (e.g., the connection management module 210 stores the keys to the connection database 240.) The Connection management server 110 does the same—it updates its record for device A in the user record data store 112 to reflect a connection to device B and vice versa. Next, the two Public/Private Message Key Pairs (AB and BA) must be generated and exchanged.

If both devices are talking to the Connection management server 110, data can be exchanged between the devices in a live session. We assume however that the devices are not online simultaneously, in which case the Connection management server 110 coordinates the connection with delays. In addition, in some instances the message key pair may be exchanged without the temporary key pair. Because the data sent to the connection management connection is protected by the respective session keys, the public keys (to write a message) may be protected from intermediaries. In a delayed sequence:

In this example delayed sequence, Device B computes the Message Key Pair BA and sends the public key to the connection management server 110. The connection management server 110 waits for Device A to go 'live' again and connect to the connection management server 110. When Device A starts its secure session, the connection management server 110 sends the information for Device B, including the Public Key Device A updates its Local RECORD with the information for Device B. Device A adds the Public Message Key BA to its Local RECORD. Now Device A computes its local Message Key Pair AB and sends the Public Key back to the Connection management server 110. In a reverse scenario, the Connection management server 110 waits for Device B to go 'live' again. The Connection management server 110 sends the Public Message Key AB to Device B to store in its Local RECORD. The connection is now established, and the Connection management server 110 deletes the two Public Message Keys AB and BA. In embodiments where the devices exchange temporary and then permanent message keys, the process is repeated for the devices to exchange the encrypted permanent message keys. When the temporary and permanent keys are used, as discussed above with FIG. 3, even the connection management server 110 cannot access the permanent message keys, because they can be decrypted from the encrypted permanent message only with the temporary private message keys held by the respective receiving devices.

At this point, in the embodiment shown in FIG. 5, devices A and B have communicated through connection management server 110. In some embodiments, the devices may receive respective networking addresses for the paired device directly from the connection management server 110. In additional embodiments, as part of the key exchange, the devices may also exchange information for accessing a networking address (or a networking address ledger) at the address server. In these circumstances, part of the key exchange 550 may include receiving the respective ledger key for the corresponding device. For example, device A may receive the public ledger key for device B and device B receives the public ledger key for device A. In addition, the devices may receive information for identifying the respective public ledger for each device (i.e., an identifier of the public ledger corresponding to the device).

Accordingly, to send a message to a paired device, such as device A sending a message to device B, the device may request 560 a network ledger from the address server 120, which returns 570 the address ledger 570 for the corresponding device, here device B. Using the public ledger key for device B, device A determines device B's network address by authenticating/decrypting the network address ledger for device B. The mechanics of the network address resolution process are discussed in detail below. Device A has now determined the network address of device B and can now send secure messages directly to device B using the respective messaging key. Because device A receives the network ledger from the address server and subsequently messages device B directly, device A's direct messaging activity is not managed or revealed to the connection management server or the address server, and because of the secure message keys, is also encrypted end-end between the devices.

Device Authentication and User Device ID

Figure 6:
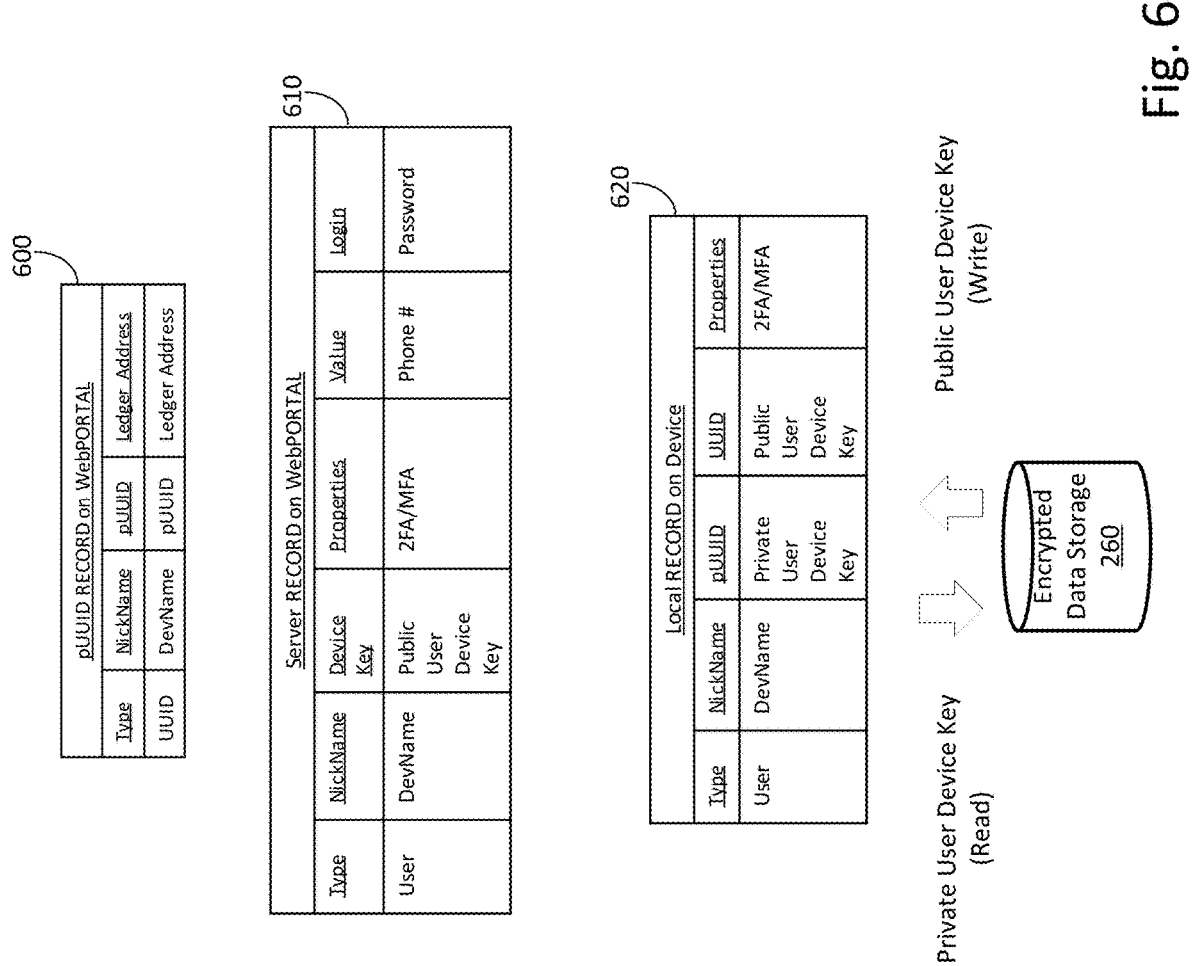
FIG. 6 illustrates example data tables stored for managing device authentication with the connection management server, according to one embodiment.

FIG. 6 illustrates example data tables stored for managing device authentication with the connection management server 110. The device authentication is used to associate a device with a user of the connection management server 110 and establish initial keys and connections. The connection management server 110 maintains a record of users and associated devices registered to use the connection management server 110. User table 610 and device table 600 are stored in user record data store 112. The user table includes information about a user, including the user's login credentials, identifying information (e.g., phone #), and other information that may be used for multi-factor authentication or other security measures. The device table 600 associates user identifiers (UUID) with individual devices and includes the ledger address for a given device. Device table 620 illustrates the information that may be maintained at the local device 100, for example by the connection management module 210. Additional information may further be stored as necessary.

Users are identified with a "private universal unique identifier" also termed a "pUUID." The pUUID in private in that the device is not used by other devices to identify the user but is used to generate user device keys and for other purposes. The pUUID is unique for every device that gets registered with the system (thru the Connection management server 110), and is sent to a device by the connection management server 110 using a secure session when the device registers with the connection management server. The pUUID is then stored on the local device 100, while a copy exists in the Connection management server 110. We will need this copy for future backup/restore and migration features, as we will explain. The pUUID for a user is assigned to a user when the user registers with the connection management system. To generate further data based on the pUUID, a hash is generated based on a hash algorithm, such as a one-way cryptographic hash function. The hash function may be based on: the pUUID, device-specific data (unique device data-check), a userword, a user passphrase, multi-factor authentication information, and other elements. Doing so provides that the hash represents a number of elements: 1) uniqueness in the system (pUUID), 2) device specific, 3) user authentication, 4) user security (cannot be copied), 5) user 2FA/MFA authentication, and 6) other elements.

A user device key pair is generated based on the generated hash. The user device key pair includes a private user device key and a public user device key and may be used to encrypt and decrypt data stored at the encrypted data storage 260. The public user device key may be used to write data to the encrypted data storage 260, and the private user device key is used to read the data stored to the encrypted data storage. As further discussed below, this allows the data to be written and managed based on the public key, permitting the remote data management and copying of the encrypted data storage using the key, while only the holder of the private user device key may access the underlying data.

When the device-specific data is included in the hash the private user device key cannot be re-created on other devices (unless it is an exact copy). In other embodiments, the device-specific information is omitted to permit the re-creation of the user device key pair based on the other data that may be recreated in other instances. This is because in backup scenarios we want to be able the regenerate the private user device key on a new, replacement device, in which case the device-specific information will differ.

This can be safely done using the connection management server 110, using user authentication and the other components of the hash. While the hash may include the pUUID and may include the password for accessing the connection management server, the hash may also include a user passphrase that is not stored at the connection management server and in some embodiments is also not stored at the device.

As noted, the hash is used to compute a user device key pair. This is a public/private key pair that includes the private user device key and public user device key. The public user device key may be used as a device identifier. However, the user device key may not be unique, and thus the ledger address for a device is separately determined and uniquely identified. The ledger address refers to the address at which a user/device's ledger is recorded at the address server 120, and thus may be an identifier for the appropriate address ledger for a given device. The ledger address for a device may be selected from a pre-fix number, may be segmented or zoned between different device regions. In one embodiment, the ledger address is derived from the public user device key and one other device identifier (such as a device name). This may permit unique devices for a user to have separate ledger addresses. In one embodiment, the pUUID and ledger address use different character sets.

On the local device, all local data which is received can be kept in the encrypted format that it was received in—the device has the Private Key to decrypt received message data. All other local data which was created on the device gets stored using the public user device key as the public write key and using the private user device key as the private read key.

The private user device key is not exposed to the user and may be stored partially in files and partially in algorithms, to make it difficult for hackers to gain access to the local data even if the data or device is obtained. Also, the private user device key never leaves the device—it is only used locally. In some embodiments, the private user device key is never stored in non-volatile memory, and is only locally maintained in short term memory that is lost when the device is powered off. In embodiments in which the hash includes a user passphrase, the user can be required to periodically (such as on device start up) enter the user passphrase to regenerate the hash and user device key pair and enable access to the data. Similarly, on a replacement device, the private user device key can thus be regenerated by the user only.

In an alternate embodiment, a device can be registered to the network multiple times. In each case, a new pUUID would be issues, so a device can carry more than a single pUUID. This could permit multiple users on one device, or a single user registered in different capacities, e.g. as a secure government worker or as a private individual.

To securely communicate with the connection management server, the client device 100A and connection management server 110 establish session keys. Each side (Device and Connection management server 110) generates a Public/Private Key pair. The server to device key pair is termed the session key pair SD, and the device to server key pair is termed the session key pair DS. Then, the public session keys are exchanged. So, on the Device, we now have:

Private (Session) Key SD
Public (Session) Key DS
And on the Connection management server 110 we have
Private (Session) Key DS
Public (Session) Key SD A message from the Device to the Server (DS) is encrypted with the (write) Public (Session) Key DS and read on the Connection management server 110 the message is decrypted with the (Read) Private (Session) Key DS.

For the reverse messaging, the Server to Device (SD), the SD Keys are used: Public Key SD to encrypt the message on the server, and Private Key SD to decrypt the message on the device.

The client device and connection management server 110 thus have secure communication which is protected by a Private Key at either side, which is never exchanged with any other device. In other embodiments, the session keys may include a temporary and permanent session key as discussed above. Using the session keys, any future session can use the same encryption keys, and secure messages can be exchanged without any login or other protocol. Having the proper Key identifies the device as such.

The session keys may be used, for example, with https/TLS, and HSTS, web sessions, and there may be additional checks to assure the Connection management server 110's authenticity. As a result, if a device is on the network, an adversary must intercept not one, but multiple servers, including global (CA) and private (our servers). This implies knowledge of DNS routing tables and private keys of several (public) servers. One cannot simply 'hack' the connection management server 110 and spoof it, (e.g. IP spoofing, DNS spoofing, HTTPS spoofing, SSL hijacking, email hijacking, Wi-Fi eavesdropping, stealing browser cookies, etc.) even with knowledge of its database and algorithms. Accordingly, man-in-the-middle attacks and other similar attack may be ineffective.

In addition, the connection management server 110 cannot be used for message decryption of messages between other devices, as no message keys are kept at the connection management server 110, so even if the server were to be hacked somehow, one would not enable to access a device's content using the compromised server.

Now that we established a secure session between the Device and the Connection management server 110, we will explain how a device gets added to the system. Essentially, the session keys are established, the public keys exchanged, and public/private keys are stored permanently at either side, needed for future messaging to/from the Connection management server 110 (without logging in). Session Keys are dedicated to all data exchanges, browser or not-browser related, which may be in addition to any SSL security used by the browser.

After the user has authenticated (e.g., via password and/or multi-factor authentication), and the secure communication has been established, the next step is to generate a pUUID for the device and send it to the device. The device puts this in its local record, and calculates the user device key pair. The public user device key is sent back to the connection management server 110.

A user record is added locally to the client device and also to the connection management server 110. The connection management server 110 record does not contain the private user device key. Next, the Connection management server 110 calculates the Ledger Address, and in some embodiments creates a first data record at the ledger address at the address server 120 for creation of the address ledger 122 for the address record. In embodiments where the address ledger is a blockchain, the connection management server 110 may create the first block. The connection management server 110 then sends this ledger address to the device for adding it into the Local Device Record as well.

After this step is concluded, there are three new records created: a local record on the device, a server record on the Connection management server 110, and an address ledger on the address server 120.

The address server may be the same as the connection management server 110 or can be implemented differently. In our preferred embodiment, the ledger address is insufficient to access (i.e., read or decrypt) a address ledger, and further requires the public user device key and other information, such as the device nickname.

Network Address Management

As discussed above, the present network system provides for session encryption (e.g., with the user authentication server) and may include message encryption (ensuring device-device security between devices). In addition, the address ledger enables devices to maintain an "address book" of paired devices and to further provide multiple possible networking addresses for communicating with the device.

Figure 7:
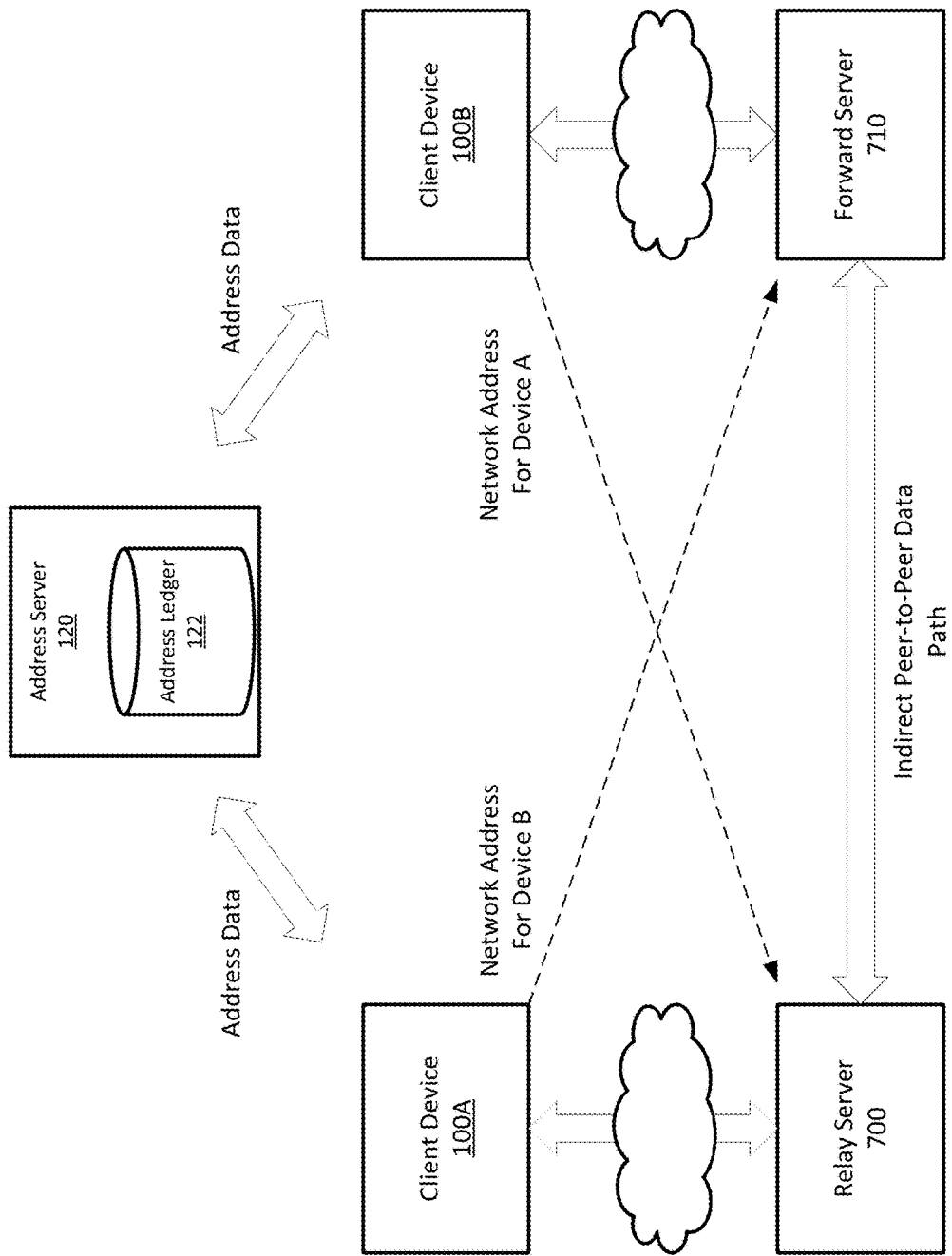
FIG. 7 illustrates an environment in which the devices may include network addresses for indirect messaging.

FIG. 7 illustrates an environment in which the devices may include network addresses for indirect messaging. In this example environment, devices may have a "network address" that points to another device, rather than itself. In the example of FIG. 7, client device 100A communicates directly with relay server 700, and client device 100B communicates with forwarding server 710. As discussed below, the address ledger for a particular device may include multiple addresses and address categories for the device.

These categories may obscure or otherwise direct messaging to the device through other servers or systems. In this example, when device 100A receives address data from the address ledger 122 for client device 100B, the network address resolves to an address of forward server 710. Similarly, when client device 100B receives address data from the address ledger 122 for client device 100A, the network address resolves to an address of relay server 700. Relay server 700 relays messages for a device, and may be used to obscure the true networking address of a device. Similarly, a forwarding server 710 may forward massages between different zones networking address regions (e.g., to re-map network addresses between zones). Accordingly, the data path between devices 100A and 100B goes through relay server 700 and forward server 710. This approach permits users and devices to gain further security and flexibility by obscuring a device's actual networking address.

Though not shown in FIG. 7, each of the relay server 700 and forward server 710 may also maintain an address at address ledger 122 that is updated when and if the network address of these servers change. In addition, the relay server 700 and forward server 710 (and other intermediate servers) may also communicate with the address ledger to retrieve the network address information for the device. As discussed further below, in this example multiple encryption keys may be used for the address ledger of each client device, such that different ledger keys may access different network address information for a given device. In this example, while the address data accessible by client device 100B from the address ledger 122 indicates the address of client device 100A is the address of relay server 700, when the relay server 700 accesses the address ledger with its ledger key (enabling different visibility), the relay server 700 identifies the network address of client device 100B as the actual address of client device 100B. This is discussed further below.

Accordingly, the message path between client device 100A and 100B may pass through many servers (and routers), both in our network, and outside our network. The message payload is encrypted using a Public/Private Key pair, and can only be understood by the paired devices.

In its simplest form, the address ledger 122 simply tracks each Device's network address (e.g., IP and Port). This enables anyone to 'find' the devices on the internet given the ledger address of a device. As discussed above, the ledger may be accessible only to devices which have the public ledger key for a device, and the ledger may be a blockchain that is updated and signed with the private ledger key for a device.

In a more complex form, the address ledger is segmented to put Network addresses in groups, each group having a maximum number of members. For example, devices may include groups including Active network addresses (e.g., Current, Recent, LastKnown) and also filtered or blocked network addresses.

At the client device, when the device activates at a new network address, different from its last 'Current' network address, the location update module 230 identifies that the address is no longer synchronized with the address ledger, and it send a message to the address server 120 to update its the address ledger 122 as a ledger write operation.

In further embodiments, this is enhanced in two additional methods (explain on later slides) including network address lists and multiple encryption keys. Network address lists may be used to reduce the number of write operations. For example, the 'Recent' network address list may include the most recent 5 network addresses are kept in a list, if the device activates on one of these network addresses, it does not need to update the 'Current' network address if corresponding paired devices attempts to use all of the 'Recent' network Addresses (in which case it will find this Device).

Multiple encryption keys (i.e., different public ledger keys) may be used to modify the visibility of the device and to control message flow to other servers for the device and which devices can see which network addresses of the client device. As one embodiment, device pairing can be 'visible' or 'non-visible' (Relay/Forwarding/Hub, etc.). That is, a device can update the IP group at the pairing level only and not keep the other IP lists current: e.g. the 'paired' IP list for individual client devices may not be updated (i.e., does not have the current network address), but the 'relay server' IP list can be current (i.e., the network address accessible by the relay server). In this circumstance, the network address used by a paired device may resolve to the relay server, which can access the 'relay server' network address list to complete message routing to the device.

In one embodiment, we assume that the two devices (Device A and Device B) are directly paired and can read each other's address ledger record. In its simplest form, each Device keeps its current network address updated by submitting a write request to the address server 120 to update its address ledger. In this example, the network address is encrypted with the private ledger key while the public ledger key is exchanged for the paired device to be able to read the Ledger content.

In blockchain technology, the blockchains are unencrypted. In our variant, certain payloads of the address ledger 122 are encrypted. That is, the address ledger nodes can alter and enter data in the address ledger, but they do not have the ability to decode such data.

The address ledger 122 may have several three layers: P2P (peer-to-peer, visible to peers), Hidden (not visible to peers, visible to relay), Trusted (not visible to peers, visible only to specific identified servers). Each layer may have a unique ledger key pair to writing and reading the respective layer information. In one embodiment, data for certain layers (e.g., the "trusted" layer), the authentication method of key encryption (e.g., encryption with the private key) is replaced with the encryption method (private key on server) to assure total security of the address ledger payload (the device's network address).

Now that we have the ability to set up the Ledger in a multi-fashion way, including whether the Authentication Method (share Public Key for read) versus the Encryption Method (only Private Key can read) is chosen can affect who has access, and when.

FIG. 8 shows an example layered ledger, according to one embodiment. In this example, the layered ledger 800 has 5 levels, which can all use a different ledger key, which is then shared with devices in the specified target group. The example groups of FIG. 8 include a direct list, relay list, backup list, forward list, and spoke list.

When the Network address is not made visible to a paired device, and alternate addressing method must be present, which allows the relay or forwarding servers to find a path to the paired device. The relay, forward, and spoke lists identify three different applications: relay is one-hub, the server knows both devices and can time-delay a message between the two, and/or it can hide the network address between the two devices by acting as an intermediary. In a forward server scenario, the message reaches the forward server as an endpoint, blocking e.g. trace-routes, and this requires additional routing information (we will maintain an address book in this scheme). The hub/spoke server is a forwarding server that allows a third party to take over the routing information. These may allow for different regional zones, countries, large corporation, certain government branches, and so on. Each hub and spoke server may maintain its own address books.

In various embodiments, based on the various types of servers and the address information listed in the address ledgers, messages may be routed accordingly. For example, a device may specify that a forwarding server is the address to which a message should be sent. To send the message to the forwarding server, the message may be routed through additional servers depending on the location of the sending device.

For a device, e.g., device A, to identify a network address of another device, e.g., device B, first, device A must have updated its Address ledger Network address with the Private Ledger Key for which the Public Key was exchanged with device B. After the write operation has been completed, the address ledger can now be read with the matching Public Ledger Key (e.g., public ledger key for A that is held by B). Accordingly, only a device which is paired can retrieve the Network address of a paired device, since it requires an exchanged Public Ledger Key (for read). To other devices, the encrypted address ledger holds no meaningful information.

Similarly, Device B is responsible for updating its ledger and device A has a public ledger key for device B. Similarly, device A determines device B's network address by reading the ledger address for device B with its public ledger key for B. device updates its ledger. When the network addresses are updated and reflect the current address of each device, the devices may directly message one another.

The various groups are updated by the device by recording different payloads that are encrypted with different keys, based on the pairing setup. For example, when the device enters a new network address location, it would update the address ledger with a new record, comprised out of (in this case) 5 sub-records, each encrypted with a different key. If so, each paired device and server can obtain the device's network address and communicate with it.

In a more complex setup, the device may only update its forward server sub-record, which means that none of the paired devices and servers, except for the forward server, can send messages to the device, as they cannot read the address ledger payload accessible with the public ledger key held by the forwarding device.

If the devices are not paired for peer-to-peer messaging, the address ledger cannot be read by a paired device. Rather, a route is created in our servers, which require each stage to have access to its connected pair ledgers. In the first stage, e.g. the Forwarding Server, this Forwarding Server takes the place of the P2P device B and now the Network address look up can be structured the same as before, except that this is now the first (or last in the reverse direction) stage of a chain. Each stage repeats the same method of encryption, until finally the target device B is found. Again, finding the route to Device B requires a server maintained address book of routes.

Network addresses accessibility may be managed by identifying addresses as 'visible' or not visible. If the network address is visible, the receive device may be online, and a direct communication can be started without interference or dependency on any servers. If the receiving device is not online, a relay server can act as an intermediary, holding the message for later delivery.

If the network address is not visible, then the message sequence gets more complicated. In the Visible method, the final destination of a message is known by the sender, as it is the receiving device's current IP. But in the not visible method, this network address is not known.

However, the device is known in the network, and it has been paired with the sending device. In the forwarding method, a Forward Server gets paired with the device and this Forward Server will have access to the receive device's network address. In the pairing with the send device, the forward server is listed as the address destination for the receive device. So, from the send device's perspective, the method remains the same.

Next, forward server accepts the message from the sending device, strip the network address information, and replace both send and receive with the forwarding data; the send network address becomes the forward server's network address, and the receive network address becomes the receive device's network address. The forward server acts as a relay server: If the receive device is online, a message is send out immediately, if not it will hold the message and try again later on. The receiving device can ping the forward server upon wake up to speed up such process.

This pattern can be repeated such that forward servers can forward to another forward server, and so on. They can be daisy chained. In all such cases, our network will have the ability to form a basic map, and to locate a device, by finding out which server is connected to the device.

This approach can be enhanced further, using 'trusted', 'backup', 'spoke' & 'hub' servers. Such servers serve different purposes: a trusted server would be used instead of a relay or forward server to assure a higher level of protection. For example such a server cannot be co-hosted, must be at a secure premise, etc. Similarly, a 'backup' server may be used to back up device data.

In addition, the network may be partitioned in various ways, such as geographical partitioning, by zoning, area or country code, by continent, by organization, by government function, and so forth. In this case, the recipient network can structure its own device connected servers (spokes) and its own forwarding servers (hubs) to build pathways into and from our network. This assures complete secrecy as to how a message gets routed over the internet.

As before, message content is encrypted and can only be decrypted by the receiving device. While the network information is public, this architecture, forwarding servers, etc., prevents detection of pairing and location data.

The address ledger records also enhance this by being encrypted, and not visible. The encryption can be partitioned (e.g., via different ledger key pairs) to allow several of the proposed schemes to coexist and overlap.

The preferred method for a device: P2P, Relay, Forward, etc., can be controlled by the device dynamically, as well as being based on the type of message exchange during pairing. For example, a visible network address is preferred for coupling with a media stream entity, e.g. for home movie viewing, but when traveling, the device may not be reachable except via the forward server so that its actual network address remains invisible to paired devices.

To support such, the aforementioned 'static' setup requires a 'dynamic' overlay—that is, devices get paired with relay and forward servers upon joining the network, and which route gets chosen depends on the device encrypting its current network address to be visible to the then selected pathway.

Still, additional information must be stored in the pairing devices at each other's local record which has to be submitted to the servers. This information can be encrypted, using the session pairing keys with that server, and this information would retain data such as final server or available routes to the other devices. Note that this is all done through server pairing with a device, and this information can be updated at a later point, e.g. because a device relocates, or leaves an organization. Essentially a distributed address book is created that enables device to device messaging without them having to exchange Network addresses.

Because devices may have various servers that receive and communicate messages on its behalf, devices must determine whether there is a message for it. In a P2P setup, devices can see each other's network addresses and ping each other directly to send and receive messages. However, not all devices will be paired on a P2P basis, and even devices that are paired P2P will be offline at times and the direct communication will fail.

For this purpose, we have introduced the types of IP messaging and the type of servers that we intend to configure. All servers in use are secure servers and have dedicated Network addresses. For a server to work with a device, it must be paired first. This is done during the initial device pairing setup. In complex cases, when forwarding and hub or spoke servers are in use, they may go through other servers until it reaches the paired server for the receiving device, upon which the connection management server 110 record for the receiving device gets updated. This is an extension of the simple method—i.e. servers forward messages between them depending on the end destination. In this example, the servers may maintain a routing map to configure routes between servers. Note that message security is unchanged, as the message is encrypted for the end destination. The server activity here is mostly related to IP and activity hiding and offline forwarding.

There are two basic main approaches for sending messages without a direct connection: P2P and a single relay server. Multi-hop relays are mentioned in the previous paragraph and they can be done autonomously.

In the first communication example, device B fails to reach device A and after a timeout it stores the message on a default relay server. device B may consider this message sent. Although device A has not yet received it, and in its normal protocol upon wakeup, or after a given time interval, it communicates with the connection management server 110 and receives a notice that a message from Device B is waiting for pickup on the relay server. The communication management server 110 may thus also manage coordination of waiting messages between devices. Device A may then contact the default relay server and retrieve the message from Device B. The message is now received.

If the two devices are not able to see each other's network address, and no direct communication is possible, then the pairing must provide a route or end server for each device, with respect to the other. For example, device A may designate a relay server for device A to pick up its messages (from device B). The server may be accessible in the address ledger based on the public ledger key provided to device B from device A. Device B sends a message to the designated relay server, which notifies the connection management server 110, the message is now sent. As with the previous example, device A upon wakeup, or on after a given time interval, communicates with the connection management server 110 and receives a notice that a message from device B is waiting for pickup on the designated relay server. Device A now contacts the relay server and retrieves the message from device B. The message is now received.

The given time interval can vary—e.g. when messages are received, the device may respond to a message and ping again in a shorter time interval. If no messages are received, the time interval can be lengthened. This is to create more rapid communications for devices that are not P2P based paired.

Accordingly, the connection management server 110 may hold message flags for a device. The ledger address for the device holding the message may be included in such flags.

Instead of using the connection management server 110, the dedicated relay servers could also hold such flags and take over this function. If multiple servers are used, then the device will have to ping each of them for message retrieval flags.

If all flags are on the connection management server 110, one ping will notify a device of all messages that are waiting and on which servers. The activity required for message retrieval is thereby minimized.

In a preferred embodiment, the server which receives the message for Device A does not have to wait for the handshake with the Connection management server 110, if it has access to the address ledger for device A and can retrieve its network address instantly. It will do so, and then format a ping to the device A. This way a message is relayed through a server, but the forwarding happens instantly. When the device receives the messages, the flag in the connection management server 110 can be removed, as the message has now reached the device.

So, in practice, most messages will be delivered instantly if a device is online, either in a direct P2P paring, or in a server relay pairing. Only (next slide) when the device IP visibility gets restricted, the delayed message may come into play. We can refer this as pull and push messaging relay. In push mode, the receiving device is (Device A) is online and can be pinged from the sending device (Device B) if network addresses are visible to each other, or it can be pinged from the relay (or other) server which has access to device A's network address as updated in the address ledger. Push mode leads to instant message forwarding without delay. When device A is offline or has not updated its network address due to other security issues, the message will be held in the relevant server, and the pull mode is used, by using the flag on the connection management server 110.

On the device side, in embodiments with mobile OS systems, enable applications to discover that new data is ready for them. They will contact the server and pull in the data when allowed to do so (on Wi-Fi, at certain intervals, etc.). We call this method of interaction (to the servers) 'Push' mode. In this mode, the applications can run, or be activated, as a background application and prepare data.

In the other mode, the 'Pull' mode, the application actively engages with another 'pinged' device. If both such devices run the application in the foreground, direct P2P communication can be established, e.g. as in a video call.

Users may also restrict Push and Pull mode in terms of battery life settings, data settings, and other considerations. In our preferred embodiment mobile devices can respond in the background to 'pings' which would make a distributed connected network fairly fast.

It is important to understand that in this organization, users can choose to communicate directly in a P2P fashion, or they can setup Relay and more servers to route their messages, to allow varying levels of network address hiding. There is no central server which has visibility to all the messages in the network, and the various servers that may see partial traffic have no way of deciphering its contents, nor can they see the total route unless both devices use the same relay server, which may or may not be common. This is unlike central server based architecture message exchange systems, in which the users must put a lot of faith in the central server operator, as all of their activity is likely logged, and their messages are possibly archived (encryption is not P2P, but can be done P2S and S2P, giving the server visibility). In our scheme all such loopholes will be closed.

Session Keys on servers can be used to make IP Routing more complex by adding additional information into the IP Packet payload that can be used to give servers additional information that may be stored in the local device record. Another method would be to rely on the connection management server 110 for some of the same information, some of which could be distributed to the various servers.

As with message keys, the connection management server 110 does not have access to (and does not store) message and ledger keys, other than its own. It does store session Keys for the devices that connect to it. This eliminates all future login protocols after connections are established, as only the proper device will have the correct public and private Keys to identify the address for a device (via the ledger key) and to securely send messages to the device (via the message keys).

VPN servers may also be used in the presented environment. Although not a forward or relay server, VPN servers may be used to secure connections between devices and networks. Clients may establish a secure connection to a VPN forward server, which strips domain and user information from messages that are forwarded to desired endpoints. Similarly, the approach may use a browser forwarding server. In this model, the user actually launches a browser window inside our app which connects to an actual browser on the browser forwarding server. The browser thus launched has no information as to the actual end user—all it can see is the Browser Forwarding Server's Network address and setup information. Browser history may be removed, and from a user's experience, the browser will look and feel very much as if they are running it locally, except that they are not logged in, don't have cookies, don't have credentials, and likely will receive less spam and advertisements. In an expanded setup, we could have the user log in to our browser, and maintain a user environment (such as cookies) which will add more benefits and ease of use without compromising the user's privacy.

Group Messaging

Devices may also establish group messages among one another. Because message key are generally established between two devices, with a message being decrypted with the private key of a device, this approach would become unwieldy with messages sent to many users. To send group messages, each group member is given a public key to decrypt a message send out by the Group Originator. Similar to the simple ledger key, encryption is done using the Private Key (Authentication Method) and decryption can be done with the corresponding Public Key. That is, messages to the group are encrypted with the private key and can then be read with the public key. This then permits a single encryption with the private key to be read by all group members with the public key. The group message key may be sent to each device in the group through a paired secure message to each group member, ensuring that only the group members have access to the key to read group messages.

Keys can be given an expiration date after which they have to be renewed, for additional security. This may apply for any type of key, but particularly for a group, in case the Public Key has been compromised.

Aside from Peer to Peer secure message exchange, we also want to enable Group distribution of messages, content, or other access. One such application is a private forum for invited users. The forum can be made completely invisible to the internet, while accessing the forum is no different than if it were on the internet.

Groups can be of two different types: Push or Pull, and we distinguish between read-only, moderated/participatory, or broadcast, which are summarized here:

| | Push Method | Pull Method |
|---|---|---|
| Read Only | RSS Stream - all users get all messages, based on certain filters | Forum or email style: Users must use an interface and select which messages to download |
| Moderated or Participatory | Moderated - users can respond to the moderator, and the moderator can choose to insert the user's comments into the stream | Any member can comment on a posted message until a max number of comments have been reached. Only selected members can start a new visible message chain. |
| Broadcast | Any member can insert a message into the stream and broadcast to all members in the group (without seeing them) | Any member can start a new message chain visible for download by all members in the group (without seeing them) |

A group may be added to the address ledger similarly to individual devices. In one example, the group address record specifies the address ledger for each group member. In another example, the group address record in the address ledger may indicate the network addresses of the group members as accessible to the group administrator. That is, the group administrator may log into the network, and use the ledger keys for each device in the group to determine the location of that device, assemble the resulting list of network addresses, and update the address ledger to reflect the current address list for group recipients.

Users are usually kept invisible from public searches. Groups however may want to make themselves visible and advertise their present. For this, metadata fields exist in which a group can add publicly searchable information such as Name, Purpose, Mission Statement, Admin/Moderator contact, SEO/Meta Data for searching.

Each group can decide if they want to keep such fields empty (go invisible), or make some or all of them public. An invisible group can still maintain the meta-data, but control with a flag whether or not the data is publicly (by non-members) searchable.

In addition, groups can create a public (outside the network) link, which would allow people to click-and-join. Essentially, they would have to install the application if they don't have it yet, and then actively seek participation into the group.

When a user wants to join a group, on a device, the sequence of steps is similar to other address management. The group message key (the public group key) and public group ledger key are received by the device joining the group. While in device pairing, mutual keys are exchanged, for a basic group setup, this is not required, although it can be elected (See the read-only, moderated, participatory, and broadcasted group constructs).

Exchanged keys are exchanged in a secondarily encrypted message, that is, in a preferred embodiment, the Group Message Key and Public Ledger Key are not exchanged through the Connection management server 110, but public keys (e.g., message keys) are used to encrypt a secondary set of exchange messages to exchange the actual keys. This way, the Connection management server 110 is not responsible for maintaining public keys for either device message pairing or for group pairing.

In one embodiment, information as to what members connect to a group is stored on both each device's local record and on the group record on the connection management server 110. In one embodiment, this permits the Connection management server 110 to send out the group messages, whereas the local device uses the group's member list to qualify incoming messages or requests, without having to pair with each member as an individual P2P connection as well.

The following process may be used to send group messages: A group device (e.g., of the creator/moderator/administrator creates a group messages. The group message is encrypted with the private group message key. This message can only be read by group members using their Public Group Gmsg Key. The connection management server 110 cannot read its contents. In some embodiments, network address routes to the group member's devices may initially be unknown: neither the Group Device nor the connection management server 110 has access to such information (no Ledger Keys). Upon receiving the encrypted message, the connection management server 110 goes through the list of group member devices, and for each device it selects an identified server to find an IP Route and sends the encrypted message into that pathway. The identified server receives the message request. The identified server selects the group member's active network routing, if available, or waits for the device to come back on-line, and it configures the group message for transport to that network address. When the device responds from the selected network address, the encrypted group message is send out as a message to the group member device.

As with other messages, only the receiving device, in this case the Group Member Device, has the relevant key (Public Gmsg Key) to decrypt the Group Message. All servers and other relay devices (router, Wi-Fi, etc.) do not have an ability to decrypt the Group Message.

In this instance, ledger information is not needed and group communications can be server executed. The Group Creator/Admin/Moderator only has to encrypt the Group Message (with the Group Private Key) and submit it to the Connection management server 110 for forwarding. The Connection management server 110 will send the message to the designated servers, identified on a per device basis.

This has several benefits. The sending device maintains message control while offloading sending. The Group Message remains encrypted for the recipients, routing devices cannot decrypt the message. Bandwidth, addressing, and other info is moved to the servers, which are naturally consuming more bandwidth, rather than the Group Device.

The basic architecture is maintained—only IP routing is addressed as a group function. This enables reuse of most of the underlying code, protocols, and architecture which have to be created to support the peer to peer secure messaging In addition, receiving devices do not show which groups they subscribe to However, in an alternate embodiment, ledger information could be retained, enabling for direct P2P connections similar to direct device pairing. In such a case, the list of group members would be utilized on the group device to send out the group messages. The benefit of this method is that this messaging is not seen by the connection management server 110.

In another embodiment, all messaging activity can delegated into a set of known (trusted) servers of choice, as long as the group member list can be obtained from the user's device, the connection management server 110, or the address ledger. Doing so would also simplify the ability of group members to broadcast back into the group. When the group moderator holds the private key, the message would be sent via the group moderator's device or via the Connection management server 110. Delegating this to other servers can have benefits.

In all of these methods, message creation (encryption) is done by the Group Moderator (usually also the Admin), and the messages cannot be read by any of the Servers, if used, for distribution. If users are allowed to send a message into the group, the encryption would still have to be done on the Group Moderator's device first—since the Private Group Mpsg Key only exists on this device. As one alternative, the group private key could be shared, for example similar to the sharing of the symmetric media key previously discussed. For example, this could be used to provide for more than one administrator or moderator, or may be used to transition the moderator role from one device to another.

In addition, groups can operate entirely in private, as their messages are not publicly posted and only visible to qualified group members. The Group Admin can add and delete members from the group.

In another embodiment, group sending can be pairwise. In this case, the peer-to-peer encryption (public→private) is used again such that the public key encrypts a message read by a the private key held by the receiving device, and not the group encryption (private→public). Each group member gets a unique message in this setup.

Data Backup, Management and Recovery

Because the public user device key is used to write encrypted data and the private user device key is used to read data, the encrypted data may be stored at a backup server and may be successfully transitioned to another device as necessary. As discussed above, the data storage module 250 uses these keys to read and write data to the encrypted data storage 260. In addition, the private user device key may be recovered with the values used to create the hash from which the user device key pair was generated. Generally, this allows data to be backed up and stored in other locations and, even if a device is lost, the data may be restored and accessed with the re-generated private user device key. In addition, in various embodiments the user device key pair may be the same across each device. That is, the constituent values that form the hash may be available at each device of the user's. This may also permit effective data storage and transfer of such encrypted data across devices and still permit each device to read and write the data.

Initially, the security subsystem 200 may typically operate as an "always on" application, which provides additional security benefits. As an example, the Connection management server 110 has a known Network address and this can be pinged for certain checksum code to validate the Server. Additional servers can be added to this mix. As we have secure end-to-end communication, we could exchange messages with known servers using the Public/Private Session Keys and validate that the device is connected to a non-compromised internet (no spoofing, man-in-the-middle, fake IP route, etc.). Also time(stamp) checks can be added.

The data stored and encrypted by the device may include data for the security subsystem 200 (e.g., configuration data of the security subsystem, pairing records, message keys, ledger keys, etc.). In one embodiment, all data to the local storage device (disk, flash memory) gets written with the public user device key and retrieved with the private user device key. As discussed above, in some embodiments the private user device key is not stored, and instead may be generated (e.g., on application start up) based on stored information, algorithms, and (optionally) user input, for example to provide a pass phrase.

Messages and other downloaded data can be kept in the format that it arrived in, i.e. the publicly encrypted message from a sending device, or it can be re-encrypted locally if preferred. If the data (sender) allows, the data can be left un-encrypted, and if the OS allows access outside the App space, the data can be moved to the user's standard folders (such as photo folders or media albums). In this scheme, the security system records data-set is already encrypted and can only be retrieved using the private user device key, whereas the downloaded and/or uploaded data-set may form a hodge-podge of encrypted and unencrypted data.

For backup purposes we prefer to re-encrypt all non-encrypted data. Whether encrypted data should be unen-crypted, then re-encrypted is a design choice. Re-encryption is not necessary, as all the required decryption keys are present in the Records data-set, and are backed up as well.

The connection data 240 may be stored to a backup device, along with additional data from the encrypted data storage. In this instance, while the connection database 240 and encrypted data storage 260 is backed up, the private user device key does not leave the device and is not backed up to the backup server. As a result, the backup server (or any other device) does not have the private key to access the backedup data. In case of a need to re-generate the user device key pair, the connection management server 110 maintains the pUUID and other data that could not be determined from the user or other information and were used in the generation of the hash from which the user device key pair was generated.

To retrieve data from backup, a device copies the backup records back onto the local device. This is useful for obtaining data from the Local Encrypted set, or restoring lost data from the local record. However, the local record data-set itself is often retrieved from backup if it was lost somehow on the device. If this happens, the app no longer runs and the user has to restore the device first.

To use in a new device, the new device must be assigned the same UUID as the prior device, and the private user device key has to be recomputed. The Connection management server 110 has retained sufficient information to recreate the original conditions that were used on the first local device, except for one thing: the user's passphrase.

In some embodiments, when a new device (onto which the backup is loaded) is activated, it receives a new pUUID. In this case, this device will have a new user device key pair. Using the user's passphrase and other identifying information, the private user device key of the other device may be recomputed, the Local RECORD can be retrieved from the backup server and decoded, then re-encoded with the newly generated keys. If the prior user device key pair is in use with other devices, then all such links have to be updated, this could also involve local re-encryption to a new key.

The new device may also receive an updated ledger address. In a next step, the network will have to propagate requests from the device to obtain all of its linked-device Ledger data to point to the new ledger address.

In some cases, data can be migrated without the backup server. In an alternate setup, the user may have both the old and new devices present, and both devices are connected to the internet. In such a case, we don't need to go to the backup server, as the local records are retained on the old device, and can be forwarded to the new device. After this has been done, the same public user device key update to all linked devices must take place as the new device as a different Ledger address.

Due to the user device key pair and ledger configuration, cloning a device is difficult to accomplish. If one is cloned, it would appear to be in two places on the network at once, which would flag the device for re-authentication. The user who has the real, uncloned, device would re-establish credentials, and in doing so, keep the cloned device locked out. This re-authentication method can be triggered automatically, using time-based leases that expire, and once expired, they would trigger re-authentication.

If the prior device is lost without a backup, a new device may still benefit from the connection management server 110 because it maintains a copy of all the pairing and group member information of the lost device.

Then the users now go through the same steps for retrieving the user device key pair as was done for restoring a new device. Once the new device is added to the network, and has its new setup, the server will go and send out request to repair all the paired devices and groups. Pairing request may be automatically granted (re-pairing), or may be manually generated. When the pairings are re-established, the user may send and receive messages as if he is using the old device—all his pairings come back to life. Because the was no backup, the prior data may be lost.

Importantly, these backup and restoration approaches do not compromise the prior security and encryption of the system. In particular, because the user's input (e.g., the pass phrase) is used to recreate the user device key pair, only the user (with that input) may successfully access the backup data. The input (e.g., pass phrase) is not stored, so the only way to retrieve it would be from the user's memory. In addition, multi factor authentication may also be used to confirm user identity.

Data stored on a client device may also be manipulated or searched by instructions from the connection management server 110. The messages from the connection management server 110 instructing the data storage module 250 to perform an action are called action messages, and they allow manipulation of the data on the device within specific rules. Essentially, they allow automatic action that otherwise would have to be done by the user.

A simple example is a corporate server doc control that updates the version of a document locally stored on a user's device. With an action messages, the group creator for the corporate (presentation) docs can simple issue an update command to all the group members, being assured that each will receive the new presentation. The command can include options such as 'overwrite-current-copy', or 'make-local-copy-of-current'.

Action Message can work with tags and meta data as well as the actual data. Tags are used for data that is being tracked—both on host and on device, while meta data is used to provide search information that can be used to find any document, within the parameters of the search and visibility. In one embodiment, action messages Action messages may be in an active mode or a passive mode. In an active mode, the user configures and sends a message on the source device. In a passive mode, the data is retrieved from the source device without user confirmation. In one embodiment, action messages only operate on shared data—sharing can be with another person or device, or a security level (friend, colleague, family). Example actions performed by the action messages include search, transfer, copy, delete, update, push, pull, etc. An action message is in the encrypted portion of a message, and controls a step within the app, this is not an OS level activity (but could read/write from designated folder, e.g. photo, video, stream, doc). Any transfer activity is always encrypted, alike the user sending a message Data may also be labeled with metadata or with tags. Users can review and edit the meta data, whereas tags are typically set up and controlled by the data source or owner. For example, with tags it is possible to track a user who copied or moved a file from Device A to Device B. The tag will reflect this, and the source device will now have information as to where this file is located on Device B.

Remote document management is the primary objective of the tagging ability. Because not only data is sent around, but also a record (the tag) is maintained at every stage, the tag can be used to affect the document at any time in the system.

Again, copy, rename, move, transfer (to another device) are all user commands that may be executed by the data storage module 250 for user data stored at the encrypted data storage 260. In some embodiments, these actions appear similar to users as an operating system function. When these actions are taken, the data storage module 250 additionally updates a tag, reports back to data tracking service, and may add or delete metadata. If allowable by the data source provider, or if not tagged, data can be copied out of the encrypted app data space onto the unencrypted OS folders that have been given access to the app. At such points, the tagging may end to prevent tracking outside the security ecosystem. But within the eco-system, all data locations, all data migration, all data updates, in short all data operations, can be tracked and this enables a data source provider to actively maintain all the distributed data.

The document can be set up to e.g. always create a (revision) copy if it gets updated, and prohibit copying outside of the app (encrypted) data space, or prohibit sending the data to another user as a message, etc. In particular, such tags may be used to track and maintain control of documents such as digital media.

Meta data about stored information may be added automatically or manually. For example, a set of pictures could be marked "family in park" in the meta data. Automatic metadata may include time and location information. Any data which the system sends around automatically gets meta data added, similar to other message exchange systems. Because messages are secure and encrypted such data is generated at the initial point of creation because it will otherwise differ across systems having a copy of the data. In the present system, because online servers generally do not keep copies of messages (and couldn't access them without the recipient's private message key), messages automatically behave consistent with downloading a copy and deleting intermediate copies.

In this eco-system, the message actually migrates from source to sender, and no copy is kept anywhere when the message is received (confirmation receipt). The message is also encrypted for the end device, and cannot be read on another device, so copies would not be useful, unless sent as a group message.

We solve this using the meta-data and action messages. Messages such as this have added meta data that enables finding a message again: in this example, one could log on to the PC, launch our app, and search for "find message from Joe between 2 and 4 pm on device X". This search, executed on device X (which has to be online for a fast response, otherwise this becomes a relay search, similar to relay message send), then results in a list of 'hits'. The user can select the relevant 'hit' and the select 'copy' or 'transfer'. If the original message was 'open', then the 'copy or 'transfer' without repercussions. If the message has security levels set (do-no-copy, only allow x,y,x, track, tag) than the 'copy' or 'transfer' may be blocked or may involve additional actions (Action Messages) to also take place.

If the user selects 'transfer', the message would be deleted from Device X and now be on his desktop device. If it was tagged data, the tagger would be able to locate the message on the new device, as it remains in our encrypted eco-system.

Any data which enters the network can be coupled with Meta Data: e.g. location for where a photograph was taken, customer name for all data presented to a customer, sales tracking information, family member data, short and long descriptions. This Meta Data can migrate in two different ways: 1. Super nodes, networked stored aggregation of Meta Data to speed up global searches—this mostly applied to shared data (e.g. office data, or provider content), 2. Local nodes: locally stored aggregation of Meta Data to speed up global searches—this mostly applies to personal data. A search can be executed on key words, alike a normal web search, and matches will be based on the key word matching—the results can point to any data that the user has access to, in all groups and all security levels that are accessible.

When searches produce matches the data may be: on the local device, immediately accessible; on a network device, network retrievable; on another device, retrievable by direct or relay request. Searches may include snippets and/or thumbnails, previews, etc., allowing the user to confirm the search result. The user can 'click' on the result and obtain the actual data. Response time to data presentation will depend on where it is stored and how it has to be accessed—size and upload speed may matter.

To perform the local private search, each device may maintain a local metadata database. The device may update remote systems with the updated metadata for the stored information. Remote access may be provided on demand by action messages and within established access limits. Local meta data may be sent to paired devices.

This provides a means for migrating data between paired devices. The required 'hit' list is protected by levels of sharing—each data set can be restricted to certain pairings, e.g. work and family can co-exist, but never see each other. The problem however is that the data is encrypted and meta data may or may not be.

First on encryption: messages that are found on device P must be decrypted using the Private Msg Key P on device P. If the message is to be transferred to device Q, it must be decrypted first, then re-encrypted for device Q using Public Msg Key Q (so that device Q can decrypt it with its Private Message Key Q). This requires devices P and Q to be paired with one another.

Second on meta data: conceptually the meta data file is located on the remote device. In the preferred embodiment, all meta data is encrypted on the local device, and is not visible to other devices. However, meta data which is shared between devices follows a more complicated 'push' function.

In a first example, image device K and device M are paired as personal devices. Both devices create meta data which is shared between them. This is typical for two personal devices own by one user (e.g. mobile and desktop), less so for paired different users. In the latter case, meta data may be shared for certain data sets—e.g. pictures or family emails, but not the general 'inbox'. This can be done by data type, data source, or connected group, etc.

What happens with the meta data is that it is continually updated on the local device. This is done for the local GUI which has search capabilities. However, this local meta data file, fully encrypted, is shared with the other personal device. So, the meta data file on device K receives continual updates as data activity takes place. At preset intervals, incremental changes to this meta data file are captured, and re-encrypted for device M. Over time device M receives all the meta data from device K (for a subset of messages) and is able to execute the same searches as one could do on device K initially.

When device M executes such a search, the 'hit' is there, but the 'data' is not—it will show that the data resides on device K, and it could even show if device K is on or offline. Online means that immediate access can be enabled, offline means that one has to wait for the other device to wake up.

In a more complex scheme, one can image that a set of connected devices will have meta data from different subsets on different devices all collected on each of such devices. This data can grow quickly, so we foresee smart data-compression and limited amounts of meta data information as ways to curb this. Active management may also be done, as well as moving some of the searching into 'remote' searches using Action Messages. Such remote searches may be slower, but they allow a must larger set of meta data to be searched. We expect that our preferred embodiment will form a hybrid of both methods.

But what is thus created is a set of data, with the possibility to go many levels deep, to enable a user to find meta data within his set of connected devices. The meta data to the user is only accessible within given permissions, and rules must be defined.

An example of such searches, restricted to picture folder for illustration, could produce data such as: "Find all pictures of school event X on date Y." If e.g. parents are paired, the resulting search would show thumbnails of all images that were captured on any of the paired devices. One could click on the search result and ask for a copy (transfer would not be an option) to collect images for a photo album.

In our preferred embodiment there are a number of additional safeguards and checks in place, resulting in a system which does not comprise security while enabling connect people to operate in a trusted way. This is however not part of the current description, we think that this chapter suffices in explaining the basic concepts here.

In short, local private searches (using local meta data), local remote private searches (using local copy of remote meta data), and remote private searches (using action messages to search on remote device), and remote all private search (using action messages to search all local copies of meta data on that device) are all an essential part of our 'cloudless' system architecture, as they are needed in certain scenarios to enable fast data access and migration.

It is possible to transfer data between non-paired devices as well, as long as a path exists between them through a sequence of paired devices. Naturally, this produces security risks that much be understood and blocked before implementing such features.

To implement metadata, when new data or a new message is received, it is not visible to the other devices. However, upon receipt, a device adds the message meta data (including time-stamp, etc.) to its searchable database. On another device, the message can subsequently be found through the remote private search and opened (remote view) or transferred (copy or migration) to the other device. The transfer requires to re-encrypt the message (from the first device to the second device. Document control would let the source device know that the message was copied or transferred. Future doc control commands will be forwarded through the link and 'trace the data.' Built-in document restrictions may block copying or forwarding. In effect, messages can be moved or copied between devices and provide a similar user experience to the current cloud-based messaging systems while dramatically increasing message protection.

These implementations may also include a means for providing visibility for law enforcement access to data or messages. In security, breaches and backdoors remain a permanent threat. In our scheme we virtually eliminate such threats as all the pairing is done in a distributed manner, i.e. per device, and hacking any device will require possession of the device, which is no different than current, e.g. cell phone access.

However, the FBI and other government agencies often issue Warrant Requests to trace information of users. This being a legal demand, compliance leads to architectural decisions which inherently create weaknesses in any communication scheme, and may lead to possible pitfalls, such as e.g. unencrypted data on the central server. We present an architecture in which such central server data cannot NOT produce the information that the Warrant Request stipulates, and we demonstrate that we can comply with the Warrants in a novel fashion, based on our architecture.

The only 'central' database is the connection management server 110. However, this database has no information as to how to decrypt any message transmitted through the network (or internet at large) other than the messages that it exchanges directly using its session keys.

Rather than a master decryption key, or handing private keys to government, the action messages may be used to comply with government requirements for data. In this case, we depict three different types of Government Sanctioned, e.g. warrant based, demands for access to secure data.

In the first case, the warrant could request all activity between two devices to be made visible. Given the named pair, the system will send an Action Message to each device to also send a copy of the message, encrypted for a paired Government identified WarrantDevice, to an ArchiveServer. Note that the ArchiveServer is a virtual server, this is not a known IP Address (which could trigger the user), and this can be any server in the network which becomes an endpoint for the copied message which it will forward to the WarrantDevice.

In the second case, the warrant could request all activity on a given device (receive and send), and all such information will be forwarded as an encrypted copy to the WarrantDevice.

In the third case, the warrant could request all available data—which is stored message data on the device as well as data which may be accessible outside the app (e.g. photos or regular email). All such data will be encrypted and sent to the Warrant Device.

The warrant issuer should be aware that the chances of this warrant-induced activity being detected by users increases with each level. Especially in the 3rd case, data retrieval should be throttled as the user may be alarmed by its device suddenly having decreases performance, degraded battery life, or high internet activity.

Accordingly, the system architecture and 'total security' approach does not get compromised by Government sanctioned warrants.

Conclusion

A secure communications system for a network has been described which enables secure communications between any two members, and between group members. This security is achieved by private keys being used on a device level—that in embodiments are not stored in the cloud or on a server. An adversary gaining access to any one key would compromise a single device-device communication channel, but generally would not allow access to other devices or compromise other device communications. In addition, the data exchange may be over public networks with unencrypted IP headers, while the included message payloads are undecipherable except to the intended recipient device.

The address server allows devices to "securely-write" device activity (IP address) and/or grouping (Group Member List). These approaches prevent random or unsolicited messages (e.g., blocking spam messaging) and prevents reading messages outside of the established key pairs. In addition, because devices are mobile and can be on and offline, addressing can include relay, backup, and forwarding.

In addition, a security breach of the connection management server 110 only uncovers connections between users of the system; it does not enable in any way a method to read the messages. An adversary attempting to impersonate the connection management server using the private session will fail due to hardwired IP paths (to server) being used as well as the limited functionality of the messaging that the connection management server 110 can send in a non-interactive session. The presented approaches also allow for remote user search and remote data management.

Collectively these approaches enable users to use the internet without being visible, without their messaging activity being visible, without their messages being decipherable, and without them having to authenticate themselves each time, providing privacy, trust, security, and authentication to users in various embodiments. In particular, users may be provided authentication via multi-factor authentication with the connection management server 110. Users are provided privacy based on the message encryption provided by message and group keys. Users are provided security with the address server, which prevents unauthorized devices from discovering the address of a given device. Finally, additional trust is provided in embodiments via server-server encryption.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for secure communication between a first device to a second device, the method comprising:
   identifying, by the first device, a request to establish communication with the second device;
   responsive to identifying the request, generating, by the first device, a first public/private key pair including a first public key and a first private key specific to the first device receiving messages from the second device;
   sending the first public key to the second device;
   receiving, at the first device, a second public key from the second device of a second public/private key pair generated by the second device;
   generating, by the first device, third public-private key pair including a third public key and a third private key specific to the first device receiving messages from the second device;
   storing the third private key as a messaging key for decrypting received messages from the second device;
   encrypting the third public key generated by the first device with the second public key received from the second device;
   sending, from the first device, the encrypted third public key to the second device;
   receiving, at the first device, an encrypted fourth public key from the second device of a fourth public/private key pair generated by the second device;
   recovering the fourth public key by decrypting the encrypted fourth public key with the first private key generated by the first device;
   storing the fourth public key as a messaging key for encrypting messages to be sent to the second device;
   securely communicating with the second device, wherein messages received from the second device are decrypted with the third private key and messages sent to the second device are encrypted with the fourth public keys;

receiving an encrypted public ledger key associated with the second device encrypted by the third public key;
decrypting the public ledger key associated with the second device with the third private key; and
determining a networking address associated with the second device by querying a ledger server with the public ledger key associated with the second device.

2. The method of claim 1, wherein the first and second device send and receive keys with messages communicate via an encrypted session between the first and second devices.

3. The method of claim 1 further comprising:
sending by the first device, a symmetric key encrypted with the fourth public key to the second device;
encrypting a media file with the symmetric key; and
sending the encrypted media file to the second device.

4. The method of claim 3, wherein the second device is a set-top box configured to decrypt the media file with the symmetric key.

5. The method of claim 3, wherein the symmetric key is a key chain sequence of symmetric keys.

6. The method of claim 1, wherein the first device does not have a networking address of the second device, the method further comprising:
sending, by the first device, a request to establish secure communication with the second device to a connection management server, the request including identifying information of the second device;
wherein sending the first public key and the encrypted third public key to the second device comprises sending the keys to the connection management server encrypted by a public key associated with the connection management server.

7. A non-transitory computer-readable storage medium for secure communication between a first device and a second device, the computer-readable storage medium containing computer program code executable on a processor for:
identifying, by the first device, a request to establish communication with the second device;
generating, by the first device, a first public/private key pair including a first public key and a first private key specific to the first device receiving messages from the second device;
sending the first public key to the second device;
receiving, at the first device, a second public key from the second device of a second public/private key pair generated by the second device;
generating, by the first device, third public-private key pair including a third public key and a third private key specific to the first device receiving messages from the second device;
storing the third private key as a messaging key for decrypting received messages from the second device;
encrypting the third public key generated by the first device with the second public key received from the second device;
sending, from the first device, the encrypted third public key to the second device;
receiving, at the first device, an encrypted fourth public key from the second device of a fourth public/private key pair generated by the second device;
recovering the fourth public key by decrypting the encrypted fourth public key with the first private key generated by the first device;
storing the fourth public key as a messaging key for encrypting messages to be sent to the second device;

securely communicating with the second device, wherein messages received from the second device are decrypted with the third private key and messages sent to the second device are encrypted with the fourth public key;
receiving an encrypted public ledger key associated with the second device encrypted by the third public key;
decrypting the public ledger key associated with the second device with the third private key; and
determining a networking address associated with the second device by querying a ledger server with the public ledger key associated with the second device.

8. The non-transitory computer-readable storage medium of claim 7, wherein the first and second device send and receive keys with messages communicate via an encrypted session between the first and second devices.

9. The non-transitory computer-readable storage medium of claim 7, the computer program code further executable for:
sending by the first device, a symmetric key encrypted with the fourth public key to the second device;
encrypting a media file with the symmetric key; and
sending the encrypted media file to the second device.

10. The non-transitory computer-readable storage medium of claim 9, wherein the second device is a set-top box configured to decrypt the media file with the symmetric key.

11. The non-transitory computer-readable storage medium of claim 9, wherein the symmetric key is a key chain sequence of symmetric keys.

12. The non-transitory computer-readable storage medium of claim 7, wherein the first device does not have a networking address of the second device, the computer program code further executable for:
sending, by the first device, a request to establish secure communication with the second device to a connection management server, the request including identifying information of the second device;
wherein sending the first public key and the encrypted third public key to the second device comprises sending the keys to the connection management server encrypted by a public key associated with the connection management server.

13. A first device for secure communication between the first device and a second device, the first device comprising a hardware processor and a non-transitory computer-readable storage medium containing computer program code executable on the processor for:
identifying, by the first device, a request a request to establish communication with the second device;
responsive to identifying the request, generating, by the first device, a first public/private key pair including a first public key and a first private key specific to the first device receiving messages from the second device;
sending the first public key to the second device;
receiving, at the first device, a second public key from the second device of a second public/private key pair generated by the second device;
generating, by the first device, third public-private key pair including a third public key and a third private key specific to the first device receiving messages from the second device;
storing the third private key as a messaging key for decrypting received messages from the second device;
encrypting the third public key generated by the first device with the second public key received from the second device;

sending, from the first device, the encrypted third public key to the second device;
receiving, at the first device, an encrypted fourth public key from the second device of a fourth public/private key pair generated by the second device;
recovering the fourth public key by decrypting the encrypted fourth public key with the first private key generated by the first device;
storing the fourth public key as a messaging key for encrypting messages to be sent to the second device;
securely communicating with the second device, wherein messages received from the second device are decrypted with the third private key and messages sent to the second device are encrypted with the fourth public keys;
receiving an encrypted public ledger key associated with the second device encrypted by the third public key;
decrypting the public ledger key associated with the second device with the third private key; and
determining a networking address associated with the second device by querying a ledger server with the public ledger key associated with the second device.

14. The device of claim 13, wherein the first and second device send and receive keys with messages communicate via an encrypted session between the first and second devices.

15. The device of claim 13, the computer program code further executable for:
sending by the first device, a symmetric key encrypted with the fourth public key to the second device;
encrypting a media file with the symmetric key; and
sending the encrypted media file to the second device.

16. The device of claim 15, wherein the second device is a set-top box configured to decrypt the media file with the symmetric key.

17. The device of claim 15, wherein the symmetric key is a key chain sequence of symmetric keys.

18. The device of claim 13, wherein the first device does not have a networking address of the second device, the computer program code further executable for:
sending, by the first device, a request to establish secure communication with the second device to a connection management server, the request including identifying information of the second device;
wherein sending the first public key and the encrypted third public key to the second device comprises sending the keys to the connection management server encrypted by a public key associated with the connection management server.

* * * * *